US009977563B2

(12) United States Patent
Kodosky

(10) Patent No.: US 9,977,563 B2
(45) Date of Patent: May 22, 2018

(54) PHYSICS BASED GRAPHICAL DIAGRAM EDITOR

(71) Applicant: NATIONAL INSTRUMENTS CORPORATION, Austin, TX (US)

(72) Inventor: Jeffrey L. Kodosky, Austin, TX (US)

(73) Assignee: National Instruments Corporation, Austin, TX (US)

( * ) Notice: Subject to any disclaimer, the term of this patent is extended or adjusted under 35 U.S.C. 154(b) by 478 days.

(21) Appl. No.: 14/632,911

(22) Filed: Feb. 26, 2015

(65) Prior Publication Data

US 2015/0169185 A1    Jun. 18, 2015

Related U.S. Application Data

(63) Continuation of application No. 13/783,967, filed on Mar. 4, 2013, now Pat. No. 9,098,164.

(60) Provisional application No. 61/679,274, filed on Aug. 3, 2012.

(51) Int. Cl.
*G06F 3/048* (2013.01)
*G06F 3/0481* (2013.01)
*G06F 9/44* (2018.01)
*G06F 3/0484* (2013.01)

(52) U.S. Cl.
CPC ........ *G06F 3/0481* (2013.01); *G06F 3/04817* (2013.01); *G06F 3/04842* (2013.01); *G06F 8/33* (2013.01); *G06F 8/34* (2013.01); *G06F 8/35* (2013.01)

(58) Field of Classification Search
CPC ............... G06F 3/0481; G06F 3/04817; G06F 3/04842; G06F 8/33; G06F 8/34; G06F 8/35

USPC .......................................................... 715/765
See application file for complete search history.

(56) References Cited

U.S. PATENT DOCUMENTS 7,213,207 B2    5/2007    Rogers
7,478,337 B2    1/2009    Kodosky
7,650,574 B2 *  1/2010    Nattinger .............. G06F 11/323
                                                    715/763

(Continued)

OTHER PUBLICATIONS

Vose et al.; "LabVIEW: Laboratory Virtual Instrument Engineering Workbench"; BYTE, McGraw-Hill Inc., Peterborough, NH, U.S.A.; Sep. 1, 1986; pp. 84-88, 90, 92; XP002264450.

(Continued)

*Primary Examiner* — David Phantana-angkool
(74) *Attorney, Agent, or Firm* — Meyertons Hood Kivlin Kowert & Goetzel, P.C.; Jeffrey C. Hood

(57) ABSTRACT

System and method for editing a graphical diagram. A graphical diagram, such as a graphical program, is displayed on a display device. User input may be received editing the graphical diagram, thereby generating an edited graphical diagram. Placement of one or more elements in the graphical diagram may be adjusted in response to the editing based on determined forces applied to the one or more elements in the edited graphical diagram based on the said editing, resulting in an adjusted edited graphical diagram. The adjusted edited graphical diagram may be displayed on the display device, which may include displaying an animation illustrating the movement of the elements to an equilibrium state in which the forces balance and movement ceases. The editing, adjusting, and displaying may be performed sequentially and/or concurrently, as desired.

22 Claims, 20 Drawing Sheets

(56) References Cited

U.S. PATENT DOCUMENTS

| | | |
|---|---|---|
| 7,743,335 B2 | 6/2010 | Rogers |
| 7,890,868 B2 | 2/2011 | Shah |
| 8,024,054 B2 | 9/2011 | Mairs |
| 8,365,135 B2 | 1/2013 | Mahoney |
| 8,397,172 B2 | 3/2013 | Kodosky |
| 8,677,262 B2 * | 3/2014 | Baier ................. G05B 19/0426 715/772 |
| 8,788,976 B2 * | 7/2014 | Birzer .................. G05B 19/042 715/810 |
| 9,046,881 B2 * | 6/2015 | Blevins ................. G05B 17/02 |
| 9,069,344 B2 * | 6/2015 | Schleiss ................ G05B 15/02 |
| 9,098,164 B2 * | 8/2015 | Kodosky ............... G06F 3/0481 |
| 2008/0039959 A1 * | 2/2008 | Fister ................. G05B 19/0426 700/56 |
| 2009/0088883 A1 * | 4/2009 | Baier ...................... G06T 7/001 700/110 |
| 2014/0040792 A1 | 2/2014 | Kodosky |

OTHER PUBLICATIONS

Anonymous; "Force-directed graph drawing", Wikipedia, Jul. 1, 2012; retrieved Jun. 4, 2013 from the Internet URL<http://en.wikipedia.org/w/index.php?title=Force-directed-9raph_drawing&0ldid=500184707>; 5 pages.

Hua et al; "Force-Directed Graph Visualization with Pre-Positioning: Improving Convergence Time and Quality of Layout"; 2012 16th International Conference on Information Visualisation (IV), IEEE; Jul. 11, 2012; pp. 124-129; XP032233298.

Bomander, Frederik; "Fun with Physics: Implementing a Physics based layout manager;" Code Project, Dec. 8, 2007; pp. 1-8.

Pavlou, Kyri; "Tutte Embedding: How to Draw a Graph;" University of Arizona, Math 543 Presentation, Fall 2008; pp. 1-29.

North, Stephen C.; "Drawing graphs with NEATO;" NEATO User's Manual; Apr. 26, 2004, retrieved Mar. 25, 2013 from <http://www.graphviz.org/pdf/neatoguide.pdf>; pp. 1-11.

* cited by examiner

PHYSICS BASED GRAPHICAL DIAGRAM EDITOR

CONTINUATION AND PRIORITY DATA

This application is a continuation of U.S. application Ser. No. 13/783,967, titled "Physics Based Diagram Editor", filed Mar. 4, 2013, whose inventor was Jeffrey L. Kodosky, and which claims benefit of priority to U.S. Provisional Application Ser. No. 61/679,274, titled "Physics Based Graphical Program Editor", filed Aug. 3, 2012, whose inventor was Jeffrey L. Kodosky, which are both hereby incorporated by reference in their entirety as though fully and completely set forth herein.

FIELD OF THE INVENTION

The present invention relates to the field of graphical diagrams and graphical editing, and more particularly to a system and method for physics based editing of a graphical diagram, such as a graphical program.

DESCRIPTION OF THE RELATED ART

Graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

However, given the two-dimensional (2D) nature of most graphical programs, creating and editing a graphical program often involve significant effort and time on the part of the developer to make the block diagram of the graphical program clear and readily understandable, e.g., to make it neat and compact by aligning graphical program elements (e.g., nodes) to keep the connecting wires between them straight. This aspect of development is tedious when editing on a desktop computer (e.g., workstation), and is even more problematic when editing a graphical program via a touch screen, e.g., on a tablet computer, such as an iPad™, provided by Apple, Incorporated. Similar issues apply generally to (graphical) diagrams in general, e.g., system diagrams, configuration diagrams, or any other graphical diagrams wherein icons or nodes are connected by lines or curves.

Thus, improved techniques for editing diagrams, e.g., graphical programs are desired.

SUMMARY OF THE INVENTION

Various embodiments of a system and method for physics based editing of a diagram, such as a graphical program, are presented below. The techniques disclosed herein are primarily illustrated in the figures in terms of graphical programs, but are generally applicable to any graphical diagrams wherein nodes or icons (i.e., graphical diagram elements) are interconnected with lines or curves, e.g., system diagrams, configuration diagrams, graphs, and so forth.

A diagram, e.g., a graphical diagram, configuration diagram, system diagram, graph, etc., may be displayed on a display device, e.g., of a computer system, e.g., a pad or tablet computer, workstation, laptop, etc., as desired. The graphical diagram may be created or assembled by the user arranging on a display a plurality of nodes or icons and then interconnecting the nodes or icons to create the graphical diagram.

User input may be received (e.g., to an editor, e.g., a diagram editor, such as a graphical program editor) editing the graphical diagram, thereby generating an edited graphical diagram. In other words, the user input may specify or implement an edit operation in the graphical diagram. Depending on the development platform, the user input may be provided in any number of ways, including, but not limited to, any of: a pointing device, such as a pointing device (e.g., mouse, stylus, trackball, etc.), a keyboard, a computer touchscreen (including, for example, a pad or tablet computer with touch interface), a computer touchpad, and so forth, as desired.

Placement of one or more elements in the edited graphical diagram may be adjusted based on the editing, resulting in an adjusted edited graphical diagram. For example, one or more (simulated) forces may be applied to one or more elements of the edited graphical diagram based on the editing, or, said another say, in response to the edit operation specified by the user input, e.g., in response to the editing by the user. In other words, based on the editing, one or more forces may be computed and applied to one or more elements in the edited graphical diagram, thereby adjusting placement of the one or more elements within the edited graphical diagram, resulting in an adjusted edited graphical diagram. Stated yet another way, the method may operate to calculate movement(s) and/or corresponding change(s) in location (possibly including size) of one or more nodes, wherein the calculated movement(s) and change(s) in location are determined by a physics based model with simulated forces. Thus the method calculates these forces and the above mentioned movement(s)/change(s) are determined based on these calculated forces.

Note that the determined forces are not actual physical forces applied to actual physical objects, but rather are simulated forces applied to diagram elements with simulated physical attributes, such as mass, charge, etc. There are a number of ways such a physics based scheme may be implemented and applied. For example, at a simple level, elements in or of the graphical diagram may repel or attract each other according to some specified relationship. In one embodiment, nodes may repel each other, and wires may attract each other, although more complex schemes may be used as desired. Via judicious use (and customization) of various physics principles, laws or rules may be defined or specified that may automatically keep a diagram compact and wires aligned, and may dynamically adjust the diagram (elements) as elements are added, removed, resized, moved, etc.

The adjusted edited graphical diagram may be displayed on the display device. Said another way, the result of the edit operation and adjustment or rearrangement of the diagram elements may be indicated in the displayed graphical diagram. In some embodiments, the adjustment or movement (or other graphically apparent modification) of the elements may be animated, e.g., the adjustment may be illustrated dynamically to the user. In other words, an animation may be displayed illustrating the movement of the elements to an equilibrium state in which the forces balance and movement ceases.

Note that in some embodiments, at least a portion of the editing, adjusting, and displaying the adjusted edited graphical program may be performed concurrently, e.g., in an interleaved manner. For example, in an exemplary case where the user input moves a node from a first location to a second location, as soon as the node's movement begins, resulting net forces may be determined and the adjusting may also begin accordingly, e.g., other nodes may start moving in response to the moving of the node, and may also be displayed accordingly, and so on in an iterative manner. When the node reaches the second location, the force determination, adjustments, and display may be continued, thereby allowing the diagram elements to reach equilibrium. As noted below, in some embodiments, the force determination and displaying of the adjusted diagram may be performed continuously even after equilibrium is reached, but since the forces are balanced (due to equilibrium being attained), no adjustments, and thus, no changes in the display, may occur, and thus it may not be apparent to the user that the physics simulation is still executing.

In other embodiments, the editing, adjusting, and displaying may be discrete events or operations. For example, the user may edit the graphical diagram, e.g., moving a node to a new location, after which the forces may be calculated and applied "behind the scenes", and once equilibrium is reached, the adjusted diagram may be displayed. Thus, from the user's perspective, the displayed diagram may not evolve smoothly, even though the underlying or associated model may do so, i.e., the displayed diagram may "jump" from the edited diagram image to the final adjusted diagram image in which all motion of diagram elements has already ceased.

BRIEF DESCRIPTION OF THE DRAWINGS

A better understanding of the present invention can be obtained when the following detailed description of the preferred embodiment is considered in conjunction with the following drawings, in which.

Figure 1A:
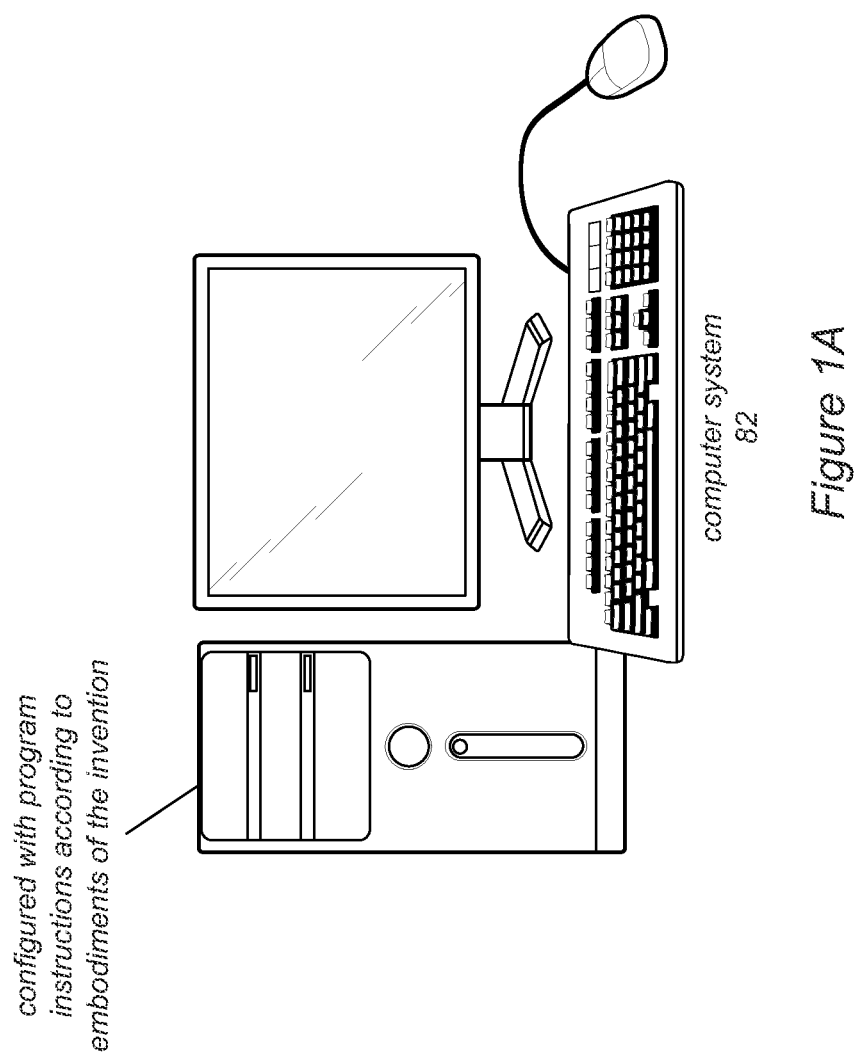
FIG. 1A illustrates a computer system configured to edit and adjust a graphical diagram according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. application Ser. No. 13/783,967, titled "Physics Based Diagram Editor", filed Mar. 4, 2013.

U.S. Provisional Application Ser. No. 61/679,274, titled "Physics Based Graphical Program Editor", filed Aug. 3, 2012.

U.S. patent application Ser. No. 12/720,966 titled "Multi-Touch Editing in a Graphical Programming Language", filed Mar. 10, 2010.

U.S. patent application Ser. No. 12/572,455, titled "Editing a Graphical Data Flow Program in a Browser," filed Oct. 2, 2009.

U.S. Pat. No. 7,987,445 titled "Comparing a Configuration Diagram to a Real System", filed Jan. 10, 2006, issued on Jul. 26, 2011. U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment", filed Sep. 22, 1993, issued on Jan. 2, 1996.

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Diagram—A graphical image displayed on a computer display which visually indicates relationships between graphical elements in the diagram. Diagrams may include configuration diagrams, system diagrams, physical diagrams, and/or graphical programs (among others). In some embodiments, diagrams may be executable to perform specified functionality, e.g., measurement or industrial operations, which is represented by the diagram. Executable diagrams may include graphical programs (described below) where icons connected by wires illustrate functionality of the graphical program. Alternatively, or additionally, the diagram may comprise a system diagram which may indicate functionality and/or connectivity implemented by one or more devices. Various graphical user interfaces (GUIs), e.g., front panels, may be associated with the diagram.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

System Diagram—A diagram with one or more device icons and graphical program code, wherein the device icons are use to specify and/or visually indicate where different portions of graphical program code are deployed/executed.

A system diagram may indicate where (i.e., on which system/device) programs or code may be executed. For example, the system diagram may include graphical indications showing where portions of the displayed graphical program code are executed. In some embodiments, various ones of the icons may represent processing elements which have associated programs for execution. At least one of the icons may represent logical elements (e.g., executable software functions or graphical program code). One or more of the device icons may represent configurable elements. Thus, the system diagram may provide a system view which allows a user to easily understand where graphical program code is deployed among the various devices in the system.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Wire—a graphical element displayed in a diagram on a display that connects icons or nodes in the diagram. The diagram may be a graphical program (where the icons correspond to software functions), a system diagram (where the icons may correspond to hardware devices or software functions), etc. The wire is generally used to indicate, specify, or implement communication between the icons. Wires may represent logical data transfer between icons, or may represent a physical communication medium, such as Ethernet, USB, etc. Wires may implement and operate under various protocols, including data flow semantics, non-data flow semantics, etc. Some wires, e.g., buffered data transfer wires, may be configurable to implement or follow specified protocols or semantics. Wires may indicate communication of data, timing information, status information, control information, and/or other information between icons. In some embodiments, wires may have different visual appearances which may indicate different characteristics of the wire (e.g., type of data exchange semantics, data transport protocols, data transport mediums, and/or type of information passed between the icons, among others).

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data.

Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1A—Computer System

FIG. 1A illustrates a computer system 82 configured to implement embodiments of the invention. One embodiment of a method for physics based editing of a graphical diagram is described below.

As shown in FIG. 1A, the computer system 82 may include a display device configured to display the graphical diagram as the graphical program is created and/or edited, and in embodiments where the diagram is a graphical program, possibly executed. For example, the display device may display a graphical user interface (GUI) of a graphical diagram editor or development environment, e.g., a graphical programming development environment application used to create, edit, and/or execute graphical programs, such as the LabVIEW™ graphical program development environment provided by National Instruments Corporation. The graphical program development environment may be configured to utilize or support physics based operations for developing graphical programs. The display device may also be configured to display a graphical user interface or front panel of the graphical program during execution of the graphical program. The graphical user interface(s) may comprise any type of graphical user interface, e.g., depending on the computing platform.

The computer system 82 may include at least one memory medium on which one or more computer programs or software components according to one embodiment of the present invention may be stored. For example, the memory medium may store one or more programs, e.g., graphical programs, which are executable to perform the methods described herein. Additionally, the memory medium may store a diagram editor for creating and editing graphical diagrams, e.g., graphical programming development environment application used to create and/or execute graphical programs. The memory medium may also store operating system software, as well as other software for operation of the computer system. Various embodiments further include receiving or storing instructions and/or data implemented in accordance with the foregoing description upon a carrier medium.

Figure 1B:
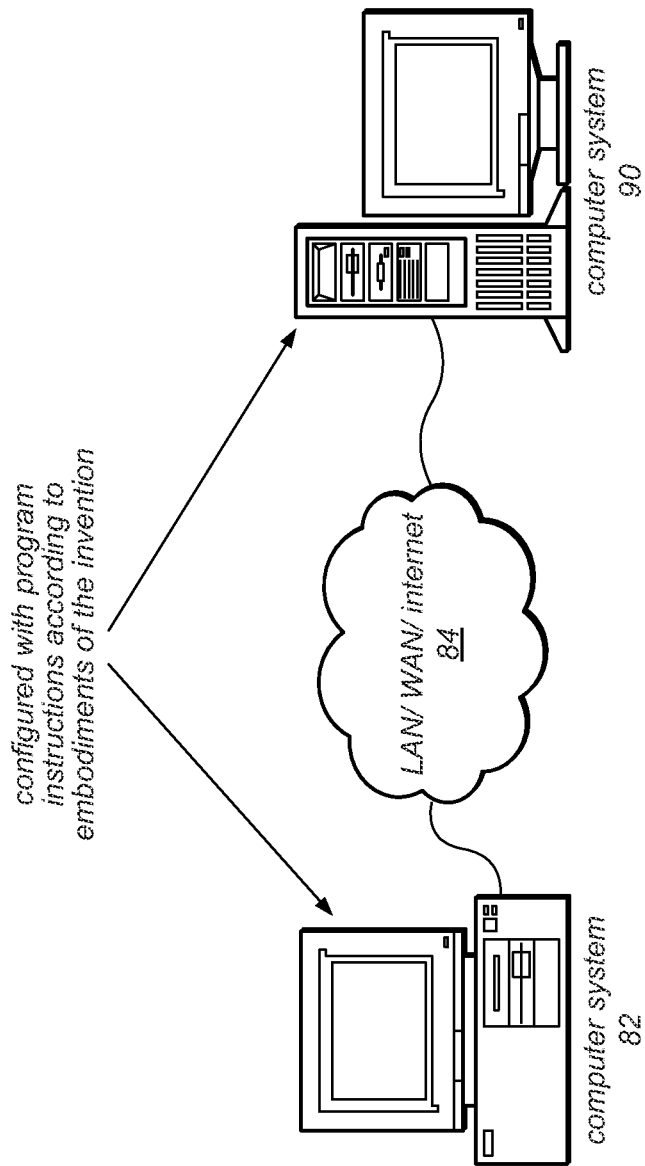
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. In some embodiments, the graphical diagram editor or development environment, e.g., graphical program development environment, may be configured to operate in a distributed manner. For example, the development environment may be hosted or executed on the second computer system 90, while the GUI for the development environment may be displayed on the computer system 82, and the user may create and edit a graphical diagram or program over the network. In another embodiment, the development environment may be implemented as a browser-based application. For example, the user uses a browser program executing on the computer system 82 to access and download the development environment and/or graphical diagram or program from the second computer system 90 to create and/or edit the graphical diagram or program, where the development environment may execute within the user's browser. Further details regarding such browser-based editing of graphical programs are provided in U.S. patent application Ser. No. 12/572,455, titled "Editing a Graphical Data Flow Program in a Browser," filed Oct. 2, 2009, which was incorporated by reference above.

In some embodiments where the diagram is a graphical program, the computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program. In one embodiment, the graphical user interface of the graphical program may be displayed on a display device of the computer system 82, and the block diagram may execute on a device coupled to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical diagram or program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
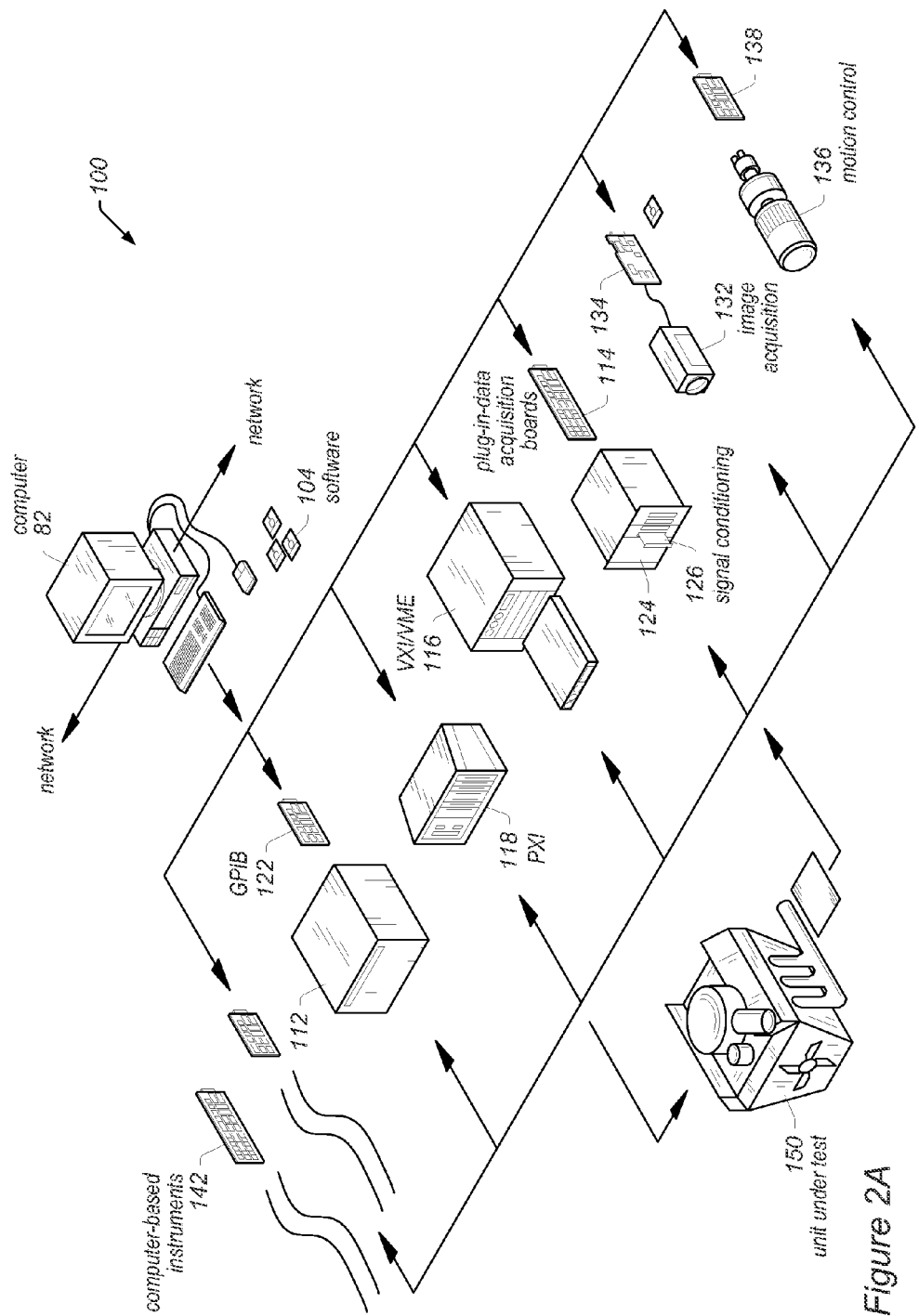
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure, or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
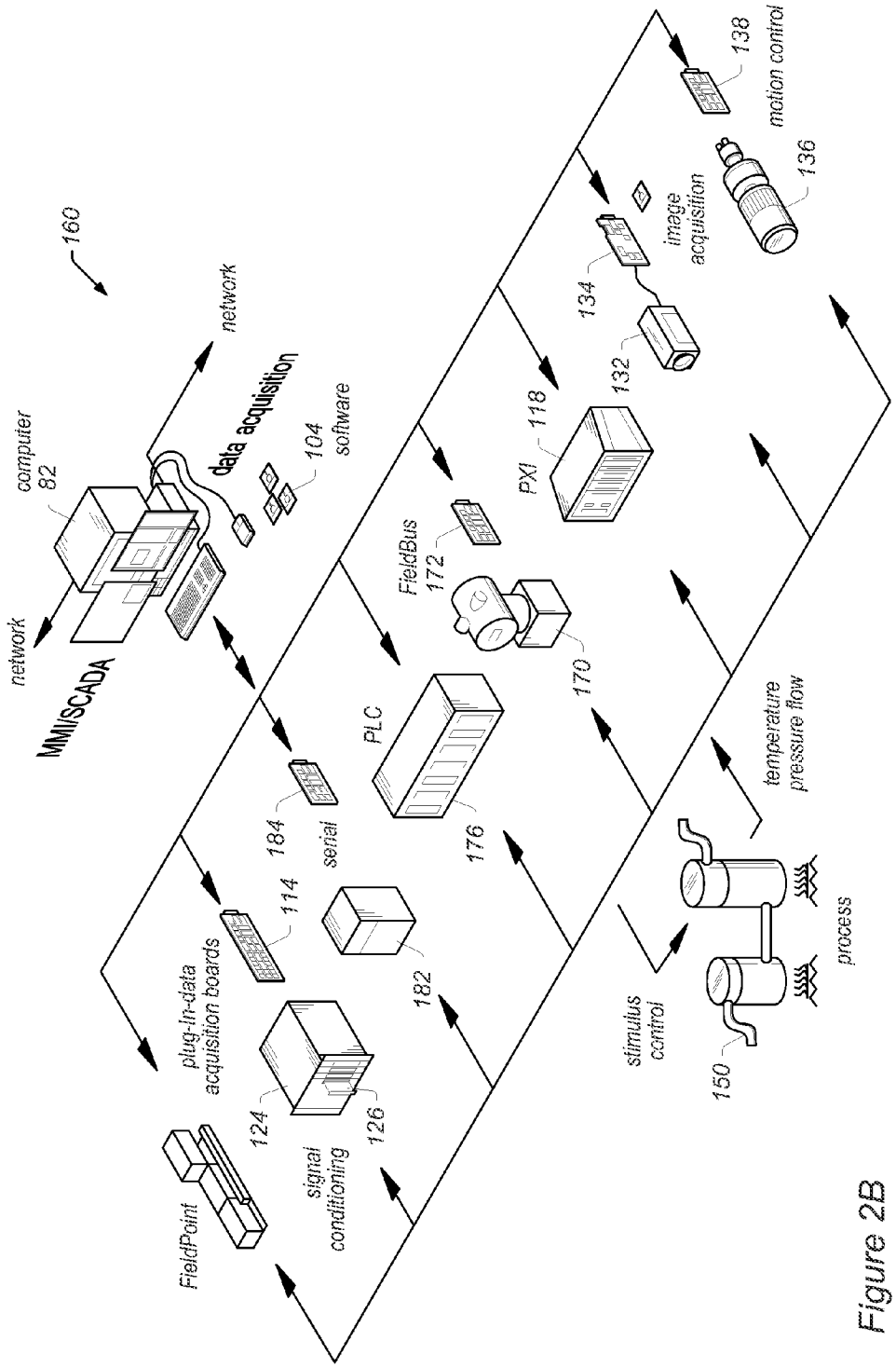
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the FieldPoint system available from National Instruments, among other types of devices.

Figure 3A:
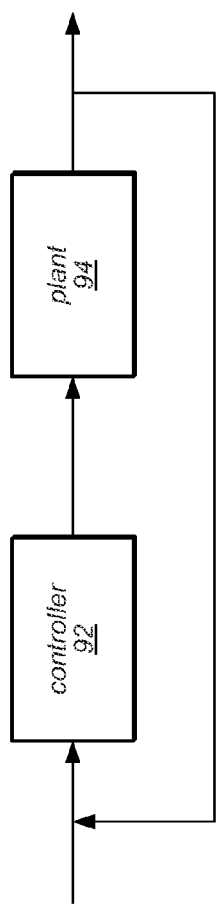
FIG. 3A is a high level block diagram of an exemplary system which may execute or utilize graphical diagrams, e.g., graphical programs.

FIG. 3A is a high level block diagram of an exemplary system which may execute or utilize graphical diagrams, e.g., graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
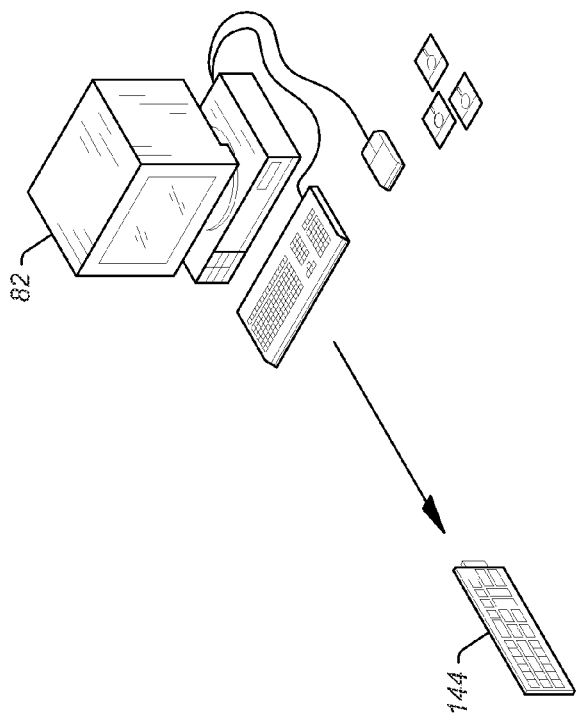
FIG. 3B illustrates an exemplary system which may perform control and/or simulation functions utilizing graphical diagrams, e.g., graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Note that some graphical diagrams may include a graphical program. For example, in some embodiments, a (graphical) system diagram may include hardware device icons and software or program icons that implement or represent graphical programs, e.g., the system diagram may specify which programs, e.g., graphical programs, are deployed, or are to be deployed, to which hardware devices. Moreover, in some embodiments, such system diagrams may be executable to deploy the programs to the specified devices, and possibly even invoke execution of the programs on those devices, e.g., may invoke execution of the distributed system specified by the system diagram.

Figure 4:
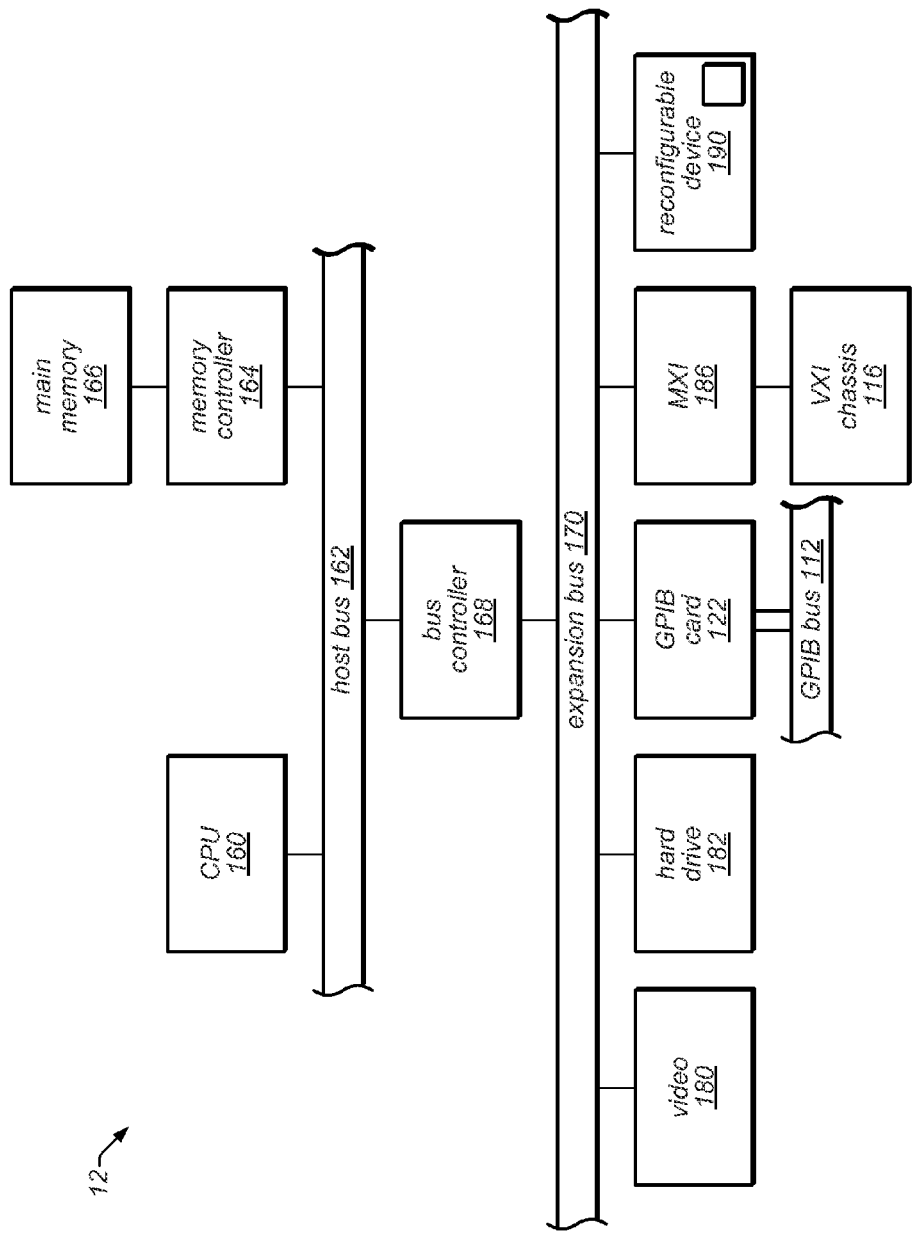
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the graphical diagram (e.g., graphical program) development environment configured to utilize or support physics based edit operations, and graphical diagrams (e.g., graphical programs) developed thereby. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a program, e.g., a graphical program, implementing the functionality disclosed herein, to the device 190. The deployed program may take the form of a circuit design/implementation, e.g., a configured programmable hardware element or ASIC. In some embodiments, the deployed program may take the form of graphical program instructions or data structures that directly represent the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program. However, note that deployment to hardware (e.g., programmable hardware element or ASIC) provides benefits that may not be obtained from a CPU based implementation.

Figure 5:
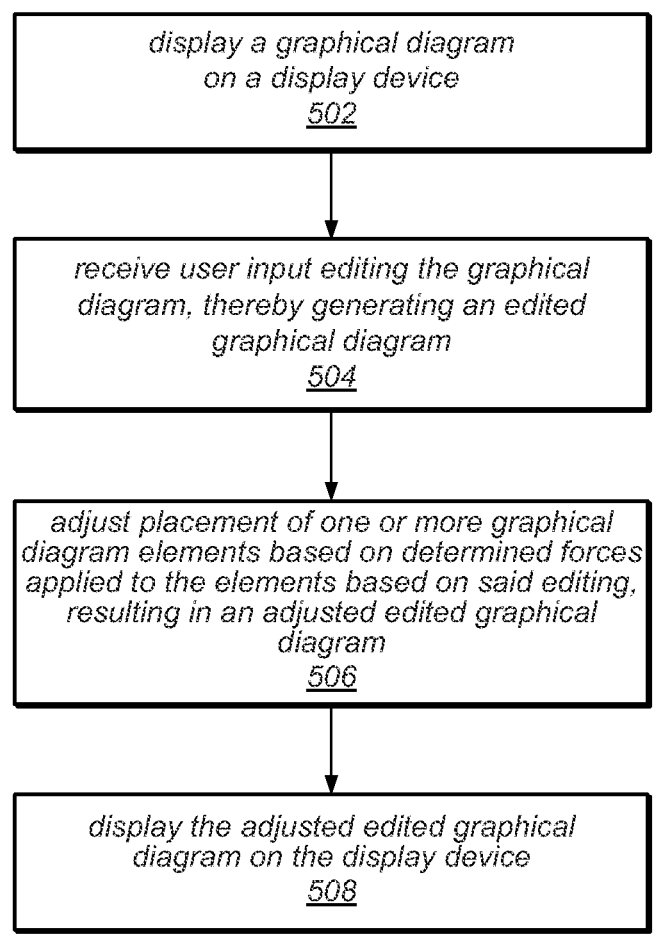
FIG. 5 is a flowchart diagram illustrating one embodiment of a method for physics based editing of a graphical diagram.

FIG. 5—Flowchart of a Method for Editing a Graphical Diagram

FIG. 5 illustrates a method for editing a graphical diagram (or simply "diagram"), e.g., a graphical program, system diagram, configuration diagram, or any other type of diagram or graph desired, using physics based edit operations. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 502 a graphical diagram, e.g., a graphical program, may be displayed on a display device, e.g., of the computer system 82 (or on a different computer system). The graphical diagram may be created or assembled by the user arranging on a display a plurality of nodes or icons and then interconnecting the nodes to create the graphical program. In response to the user assembling the graphical diagram, data structures may be created and stored which represent the graphical diagram. In embodiments where the graphical diagram is a graphical program, the nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program. The graphical programming development environment may be configured to support physics based editing operations, as will be described in more detail below.

In an alternate embodiment, the graphical program may be created in 502 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument.

Figure 6:
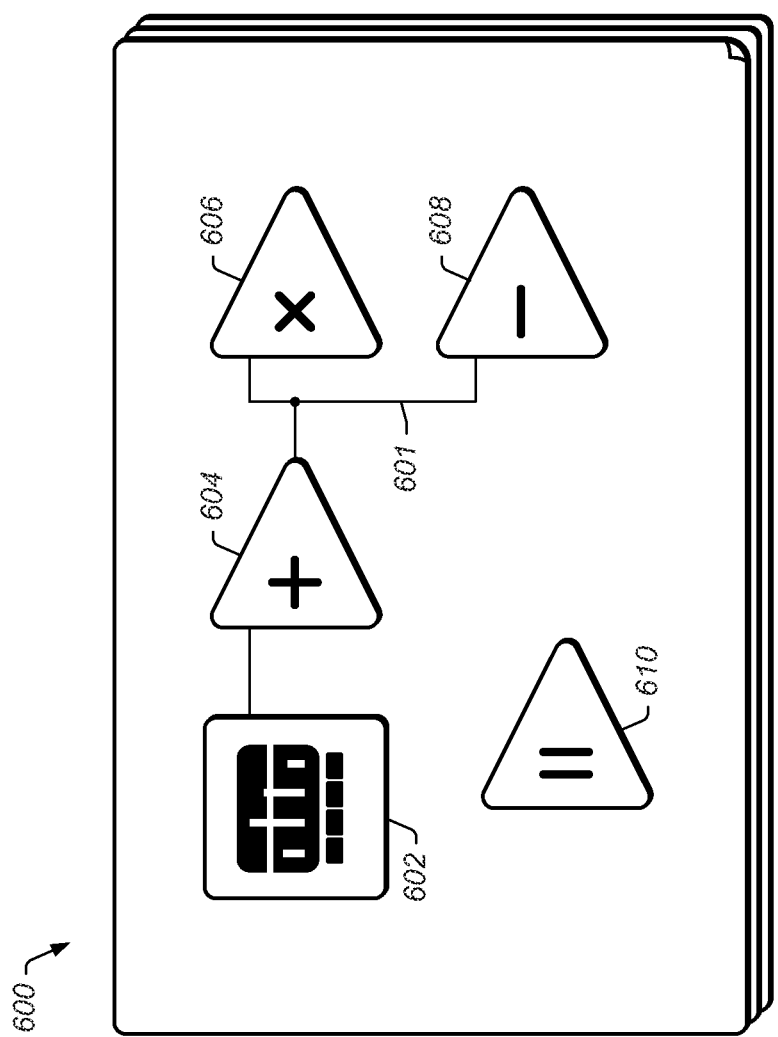
FIG. 6 illustrates an exemplary block diagram of a graphical program, according to one embodiment.

FIG. 6 illustrates a simple exemplary graphical diagram, specifically, a graphical program 600, according to one embodiment. As may be seen, this example graphical program includes various interconnected graphical program nodes, including a "histogram node" 602, an "add node" 604, a "multiply node" 606, a "subtract node" 608, and an "absolute value node" 610. Note that the nodes shown are exemplary only, and that any other graphical program nodes or structures may be used as desired, e.g., loop nodes or structures that include a frame within which other nodes may be placed, such as graphical WHILE loops, graphical FOR loops, and so forth. Other examples of nodes or structures with frames include a graphical case statement, a graphical sequence structure, and a graphical conditional structure, among others. Various exemplary graphical program elements, such as those shown in the graphical program of FIG. 6, and variants thereof, will be used to illustrate various exemplary physics based edit operations, described below with reference to FIGS. 7-12. However, it should be noted that the same or similar techniques may be applied to other types of graphical diagrams.

In 504, user input may be received (e.g., to an editor, such as a graphical program editor) editing the graphical diagram, thereby generating an edited graphical diagram. In other words, the user input may specify or implement an edit operation in the graphical diagram. Depending on editor or the development platform, the user input may be provided in any number of ways, including, but not limited to, any of: a pointing device, such as a pointing device (e.g., mouse, stylus, trackball, etc.), a keyboard, a computer touchscreen (including, for example, a pad or tablet computer with touch interface), a computer touchpad, and so forth, as desired.

In 506, placement of one or more elements in the edited graphical diagram may be adjusted ba, resulting in an adjusted edited graphical diagram. For example, one or more (simulated) forces may be applied to one or more elements of the edited graphical diagram in response to the user input, or, said another say, in response to the edit operation specified by the user input, e.g., in response to the edit. In other words, based on the user input (or edit operation), one or more forces may be computed and applied to one or more elements in the edited graphical diagram, thereby adjusting placement (e.g., respective positions, possibly including boundary positions) of the one or more elements within or of the edited graphical diagram (or other geometric attributes of diagram elements or the diagram in general), resulting in an adjusted edited graphical diagram. Stated yet another way, the method may operate to calculate movement(s) and/or corresponding change(s) in location (possibly including size or shape) of one or more nodes or other elements, or the diagram at large, wherein the calculated movement(s) and change(s) in location are determined by a physics based model with simulated forces. Thus the method calculates these forces and the above mentioned movement(s)/change(s) are determined based on these calculated forces. In other words, the method may operate to calculate changes in one or more of the nodes in the diagram, e.g., movement(s) and/or corresponding change(s) in location (possibly including size) of one or more nodes, wherein the calculated movement(s) and change(s) in location are determined by a physics based model with simulated forces. Thus the method calculates these forces and the above mentioned movement(s)/change(s) are determined based on these calculated forces.

Note that the determined forces are not actual physical forces applied to actual physical objects, but rather are simulated forces applied to diagram elements with simulated physical attributes, such as mass, charge, etc. There are a number of ways such a physics based scheme may be implemented and applied. For example, at a simple level, elements in or of the graphical diagram may repel or attract each other according to some specified relationship. In one embodiment, nodes may repel each other, and wires (or more generally, edges or curves) may attract each other, although more complex schemes may be used as desired. Via judicious use (and customization) of various physics principles, laws or rules may be defined or specified that may automatically keep a diagram compact and wires aligned, and may dynamically adjust the diagram (elements) as elements or added, removed, or moved.

In 508, the adjusted edited graphical diagram may be displayed on the display device. Said another way, the result of the editing, including any effects of the forces on the elements, may be indicated in the displayed adjusted edited graphical diagram.

In some embodiments, applying forces to the one or more elements may include determining one or more forces for each of the one or more elements based on their positions, summing the forces on each of the one or more elements, thereby determining resultant forces, moving the one or more elements based on the resultant forces, and repeating the determining, summing, and moving one or more times in an iterative manner until an equilibrium condition obtains, i.e., until forces balance and the elements stop moving. In one embodiment, displaying the adjusted edited graphical diagram may include displaying an animation (or "movie") that illustrates the movement (which may include resizing, reshaping, or otherwise changing graphical aspects or geometry) of the diagram elements (or the diagram in general, e.g., diagram boundaries, shape, and so forth), as discussed below in detail.

FIGS. 7-12—Exemplary Physics Based Edit Operations

FIGS. 7-12 illustrate various exemplary physics based edit operations on a graphical program, although it should be noted that the operations shown are meant to be illustrative only, and are not intended to limit the physics based edit operations to any particular set, or any particular type of graphical diagram. Note that in these examples, and in the example figures described below, forces are indicated by arrows, each representing a force applied to a graphical program (or more generally, graphical diagram) element (including program boundaries).

Figure 7:
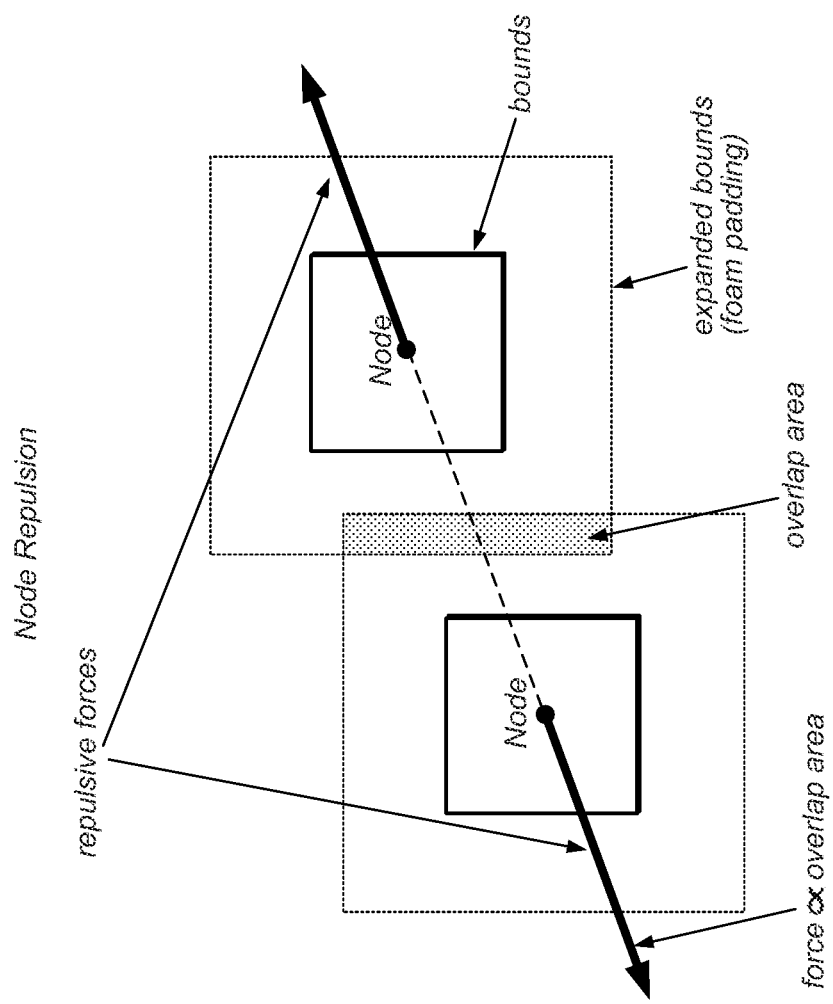
FIG. 7 illustrates repulsion between nodes in a graphical diagram editor, according to one embodiment.

In one embodiment, due to unwanted long-range effects of simple Coulomb type forces ($r^2$ forces), short range forces may be specified to operate between elements. Such short range forces may operate in a manner similar to a "foam" around the elements, e.g., nodes, where, for example, when two nodes are too close, it is "compressed", and forces the nodes apart, but once the nodes are (far enough) apart the force goes to zero. Such an exemplary force is illustrated in FIG. 7, where, as may be seen, "expanded bounds" (the above "foam padding") that extend beyond the normal bounds of the nodes are defined. In response to overlap of these specified expanded bounds, repulsive forces proportional to the overlap area may be determined and applied to the nodes, as indicated by the arrows labeled "repulsive forces". Thus, if the user "drops" a node onto an already populated block diagram, the various elements in the diagram may automatically rearrange themselves to make room for the new node, and/or the new node may automatically move to minimize congestion in the diagram.

Note that in some embodiments, the expanded bounds, overlap area, and repulsive force vectors (arrows shown), may not actually be shown or illustrated in the graphical diagram; however, in other embodiments, the expanded bounds, the overlap area, and/or the resulting forces, (and/or any other aspects of the technique) may be displayed in the graphical diagram, e.g., to indicate to the user what is likely to result from the edit operation. Such display of these aspects may be temporary, e.g., may disappear upon completion of the edit operation, once the forces have been applied, etc., as desired.

Figure 8:
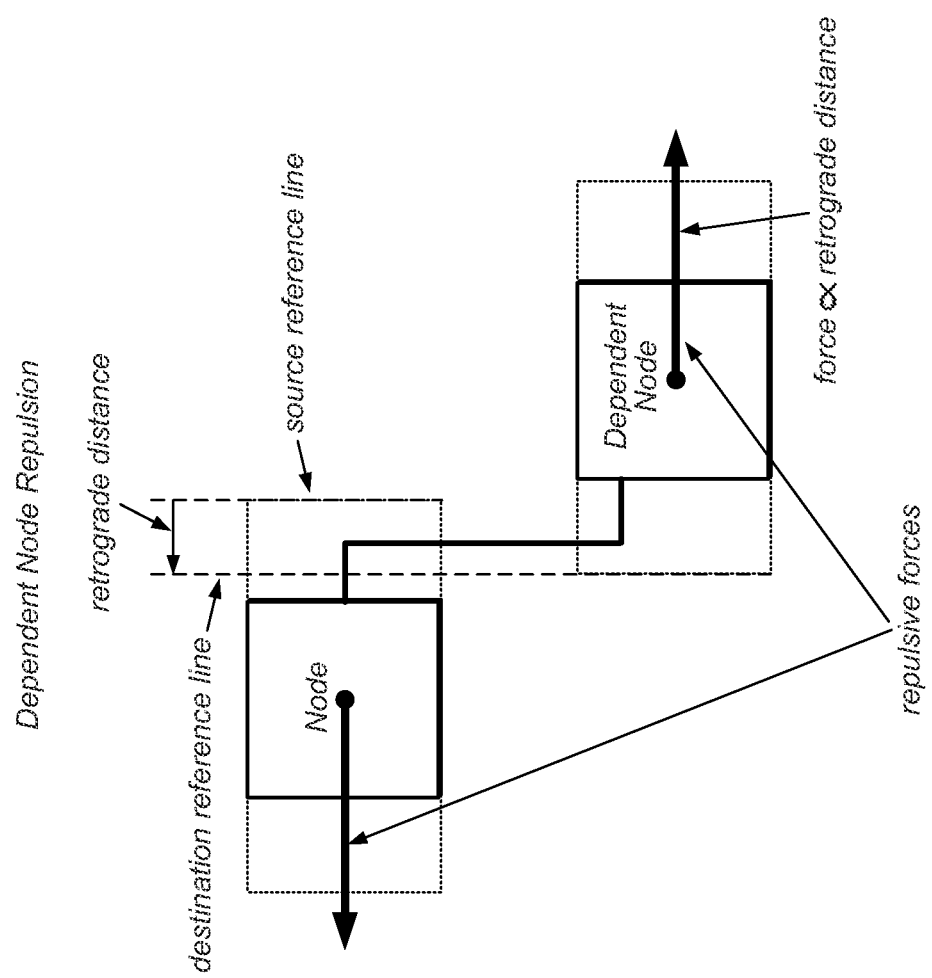
FIG. 8 illustrates dependent node repulsion in a graphical diagram editor, according to one embodiment.

As another example, in one exemplary embodiment, a short range force may be defined or specified that moves nodes to the right of nodes they depend on, i.e., to the right of nodes from which they receive input, i.e., "source nodes" (and/or moves the source node to the left of the dependent node). An exemplary illustration of such a force is presented in FIG. 8. As shown, in this example, when a node (labeled "dependent node") is wired to receive input from another node (a "source node", labeled simply "node"), a distance, referred to herein as a "retrograde distance", may be determined between a specified source reference line and a destination reference line. These reference lines may indicate or demarcate an expanded boundary of the nodes in a similar manner as the "foam pads" of FIG. 7, but may be limited to the sides of nodes that have I/O connections, in this case, the left and right sides, as shown. As may be seen, the retrograde distance is simply the projected overlap between these expanded "connection" boundaries. The term "projected" here refers to the fact that the areas only overlap in the 1D (horizontal) projection. As also indicated in FIG. 8, a repulsive force proportional to the determined retrograde distance may be determined and applied to the nodes, thereby moving the dependent node to the right of the (source) node (and in this case, also moving the source node to the left).

Figure 9:
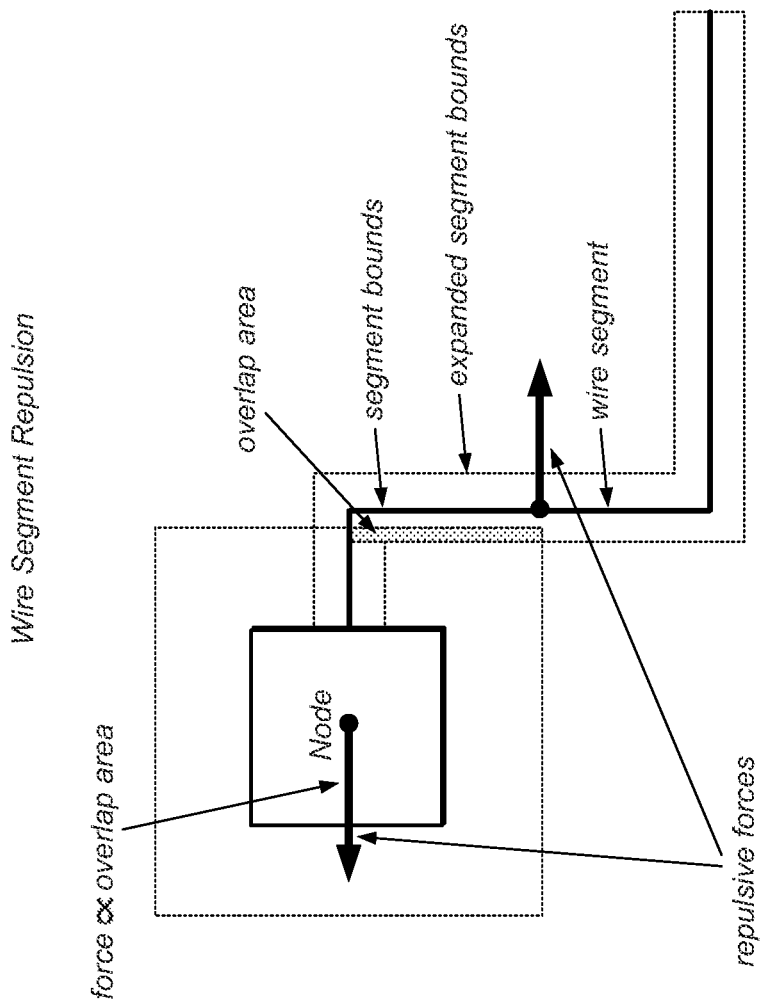
FIG. 9 illustrates wire segment repulsion in a graphical diagram editor, according to one embodiment.

Similar techniques may be applied to wires, which connect nodes in a graphical program. For example, in one embodiment, wire segments may repel nodes as well as each other, with the same or similar short range force. FIG. 9 illustrates wire segment repulsion with respect to a node, according to one embodiment. As FIG. 9 shows, a wire segment may have associated expanded segment bounds that extend beyond the wire segment bounds. If the expanded segment bounds (or a specified portion thereof, e.g., the vertical segment shown) overlaps the nodes expanded boundary, as indicated by the overlap area shown, a repulsive force proportional to the overlap area may be determined and applied to the node and/or the wire segment (in the illustrated embodiment, the force is applied to both), thereby moving them apart.

Figure 10:
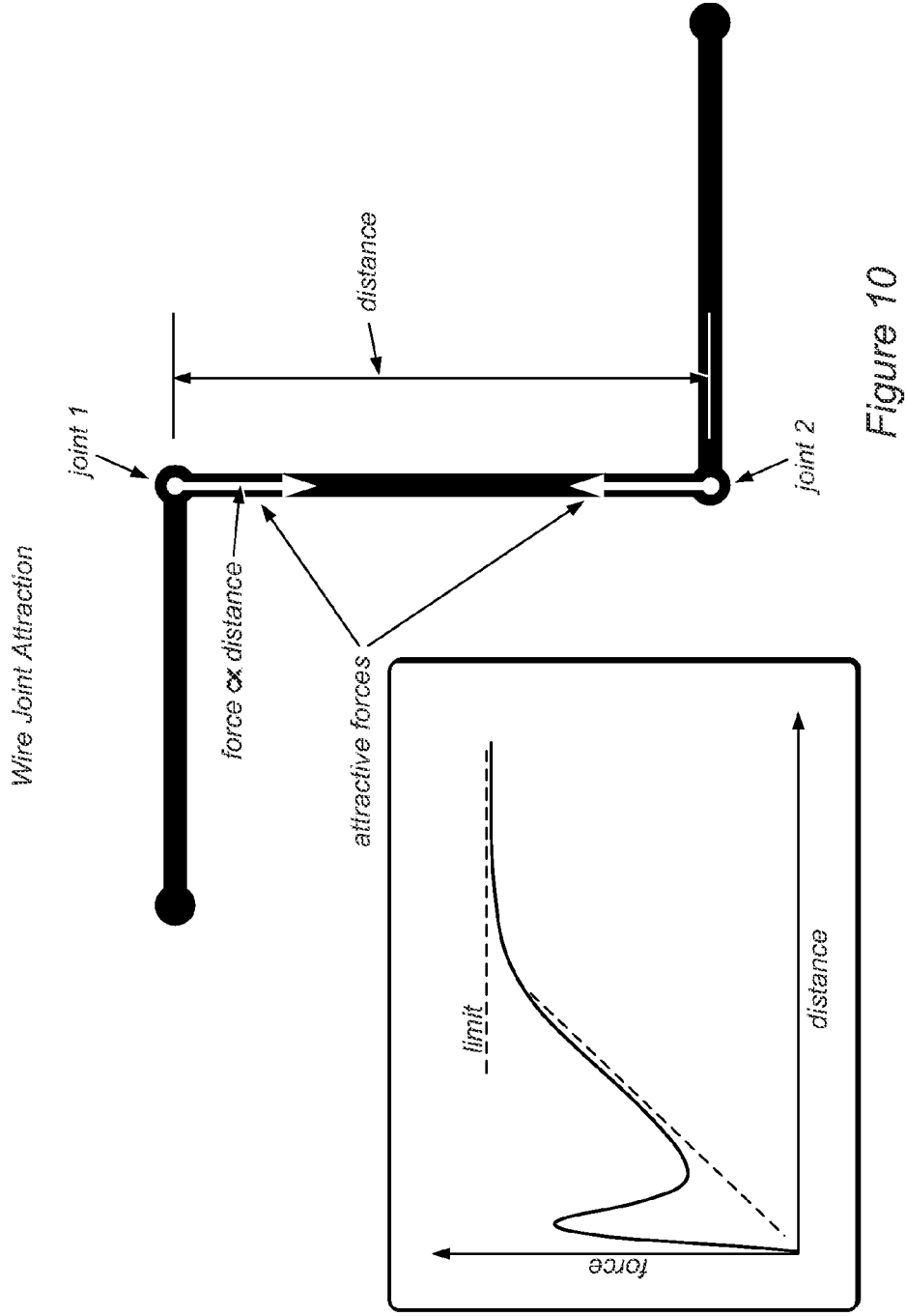
FIG. 10 illustrates wire joint attraction in a graphical diagram editor, according to one embodiment.

As another exemplary case, wire joints may have an associated attractive force that operates to minimize the distance between parallel segments of a wire. FIG. 10 illustrates an exemplary embodiment where joint 1 and joint 2 are adjacent joints of a vertical segment of a wire, e.g., where the wire may connect two nodes, not shown. Note that in general, wire segments in a graphical program are constrained to be either vertical or horizontal, as shown. In this example, a distance is determined between joint 1 and joint 2, and an attractive force proportional to this distance determined and applied to the joints, and thus, their respective horizontal segments, thereby moving the joints/segments closer to each other. Note that in this example, the attractive force may generally increase as the distance between the joints/segments increases. While the above techniques directed to connecting elements are described with respect to graphical program wires, they are also applicable to any other types of connecting elements in graphical diagrams, e.g., graph edges, lines, or curves connecting graphical diagram elements.

It should be noted that the particular force dependencies used, e.g., proportional (and/or inversely proportional) to distance, are meant to be exemplary only, and that any types of forces and dependencies may be used as desired. Note, for example, the inset force vs. distance plot in FIG. 10, which shows that the proportional (to distance) relationship described above may only apply at mid-range distances. As indicated, in this exemplary case, the attractive force ceases to be linearly dependent on distance at close range and at far range. More specifically, as distance increases, eventually the magnitude of the resulting force levels off, as indicated by the "limit" line shown. Similarly, as the distance decreases (from mid-range), the force magnitude increases sharply, then drops off even faster, resulting in a force profile that causes the segments to "grab" one another at some optimum distance. Thus, in some embodiments, the force law or profile may include a non-linear component at small distances. As result of this technique applied to wires may automatically straighten small wire "jags". Of course, any other force profiles may be defined and used as desired, with corresponding, possibly complex, behaviors of effected elements.

In a further example, nodes and boundaries (e.g., of structure nodes and/or of the graphical program (or more generally, diagram) itself) may have associated force relationships. For example, some structure nodes include frames or borders that can contain other nodes, e.g., loops, sequence structures, and so forth, and so the frame has an inner boundary. In some embodiments, nodes and wire segments may repel the boundary of the enclosing structure (node) with a short range force similar to those described above.

Figure 11:
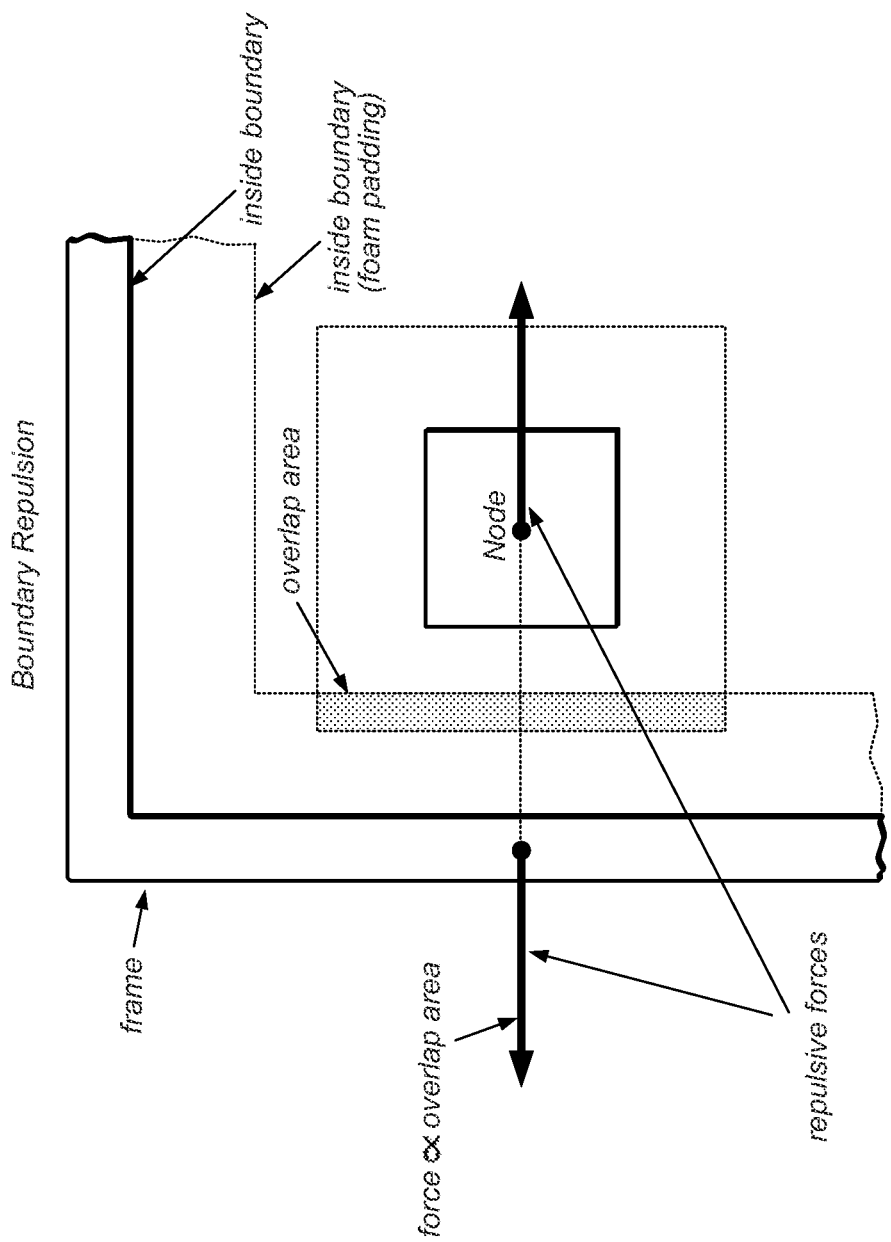
FIG. 11 illustrates boundary repulsion in a graphical diagram editor, according to one embodiment.

FIG. 11 illustrates an exemplary embodiment where the inside boundary of a frame of a structure node has an associated inset boundary (or inner expanded boundary, e.g., "foam padding" per the above-described metaphor). Similar to the example of FIG. 7, if a node's expanded boundary overlaps with the inset boundary of the frame, repulsive forces proportional to the resulting overlap area (so labeled) may be determined and applied to the node and/or the frame. Note that in the embodiment shown, it is the left frame edge/boundary whose inset boundary overlaps, and so the resulting force applied thereto is horizontal (and to the left). In some embodiments, such a force may move the entire frame/structure node. However, in other embodiments, only the "overlapped" frame segment may be moved, and so the frame may be stretched in the direction of the applied force, automatically enlarging in that direction to accommodate the node. As also shown, the node experiences a corresponding force to the right, and may thus move accordingly.

Figure 12:
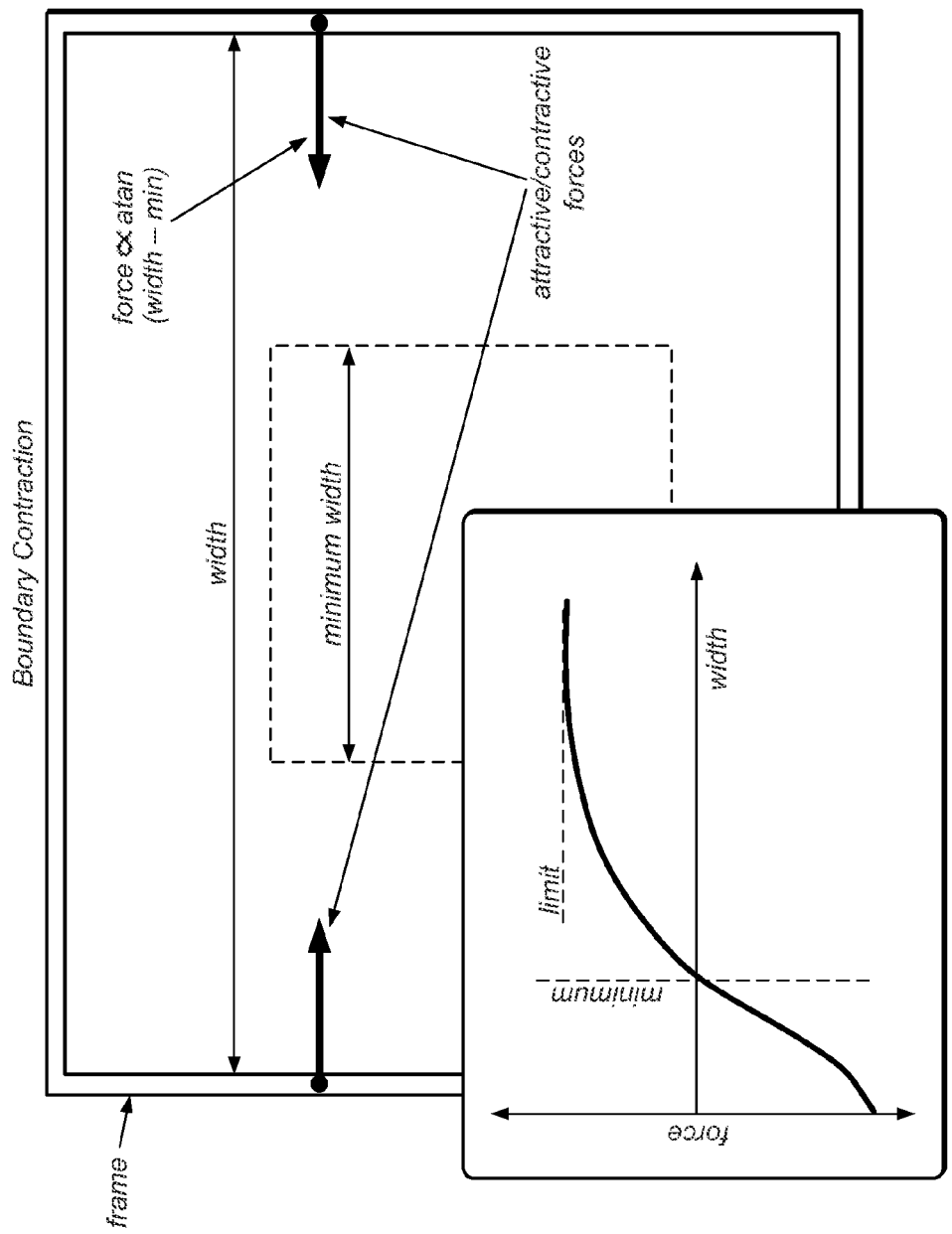
FIG. 12 illustrates boundary contraction in a graphical diagram editor, according to one embodiment.

In some embodiments, such structure node frames may have associated contractive (or attractive) forces that may operate to "shrink wrap" contained nodes, thereby minimizing the footprint of the structure node (with contained elements). FIG. 12 illustrates an exemplary embodiment in which the inside width of the frame, labeled "width" in the figure, may invoke such contractive forces, as shown. More specifically, in this example, if the width exceeds a specified minimum width (so labeled), contractive forces proportional to the arctangent (atan) of the difference between the width and the minimum width may be determined and applied to the frame edges (in this particular case, just the left and right edges, as shown).

As illustrated by the force profile inset shown in FIG. 12, this particular force law specifies that the magnitude of the force goes to zero as the width approaches the minimum width, grows as the width exceeds the minimum width by greater amounts (up to a limit, as indicated), and turns negative (thereby becoming repulsive/expansive/dispersive) as the width becomes less than the minimum width. Thus, the frame boundary will tend to shrink if the width exceeds the minimum width, and will tend to expand if the width becomes smaller than the minimum width (both within bounds, of course, as indicated in the force profile, and as is the case with the arctangent function).

In another embodiment, the contractive force may be constant, or almost constant, which may prevent crushing of nested structures, e.g., structure nodes within structure nodes.

It should be noted that the above force schemes, laws, profiles, distances, boundaries, and element behaviors, are meant to be exemplary only, and that any types of force schemes, laws, profiles, distances, boundaries, and element behaviors may be used as desired, and in any combinations.

Note further that an important benefit of using such forces is that they generally operate together in a smooth graceful manner. For example, two or more of the forces and corresponding effects may operate at the same time, possibly at odds with one another. In such cases, all forces may be computed and summed per element (within appropriate constraints, e.g., constrained movement, force directions, etc., for specific elements), and the resultant forces may then move the elements accordingly. Thus, for example, in a case where a frame boundary of a structure node has a contractive force due to its width exceeding the minimum width, but contains nodes whose inter-node repulsive forces prevent them from clustering within the minimum width, and where the frame and the nodes are repelled by each other, an equilibrium may be reached that results in a compromise between the specified behaviors.

In some embodiments, the forces may be applied over time. In other words, rather than simply determining the forces and moving the elements in a single step, the method may utilize dynamics to reach equilibrium among the elements, i.e., applying forces to and moving the elements until an equilibrium condition obtains and thus, movement ceases. Elements may be assigned masses to modulate or control the applied forces. Moreover, in order to prevent oscillations, which can be common with complex force based systems, damping may be employed, e.g., a friction-like effect that operates to slowly lower the kinetic energy (which may be considered "temperature") of the system to zero. In some embodiments, such damping may be tuned to optimize convergence to equilibrium, referred to as critical damping. Exemplary dynamical equations or relationships contemplated include:

$$\Delta v = \Delta t * \text{force}/\text{mass} \quad (1)$$

$$v = \text{damping} * (v + \Delta v) \quad (2)$$

$$\text{position}' = \text{position} + \Delta t * v \quad (3)$$

where v is velocity, and t is time. However, it should be noted that any other dynamical relationships may be used as desired, as the techniques disclosed herein are not limited to physically real dynamics, e.g., "real physics". Rather, any type of force laws and relationships may be defined and used as desired.

Thus, in some embodiments, the editor may create and execute a dynamical model or simulation of the block diagram (graphical program or other graphical diagram), simulating physical interactions between the elements. The model may specify and implement physics based attributes and behaviors of the graphical program or graphical program elements via a plurality of physics based parameters, as discussed below in more detail. The model may run continuously in a loop, calculating forces on all elements, e.g., nodes and wire joints, updating velocities and updating positions. In one embodiment, the mass of nodes may be greater than that of wire joints so joints will move faster and adjust more quickly.

Accordingly, once the user has edited the diagram, or has begun the edit operation, the editor may display an animation or "movie" of the diagram as the elements automatically adjust, e.g., as the forces are applied and elements are moved accordingly. In other words, displaying the adjusted edited graphical program on the display device may include displaying an animation that illustrates the moving (which may include resizing, reshaping, etc.) of the diagram elements, possibly including diagram boundaries, shape, etc. In one embodiment, the frame rate of the movie may be equal to the update cycle of the model, although in other embodiments, the frame rate of the movie may differ from the update (or cycle) rate of the model. For example, the model may cycle much faster than 30 frames per second (fps), but the movie may have a frame rate at or close to 30 fps. In one exemplary embodiment, the movie frame rate may be variable, depending on the rate of change in the positions (or placements) of the elements, e.g., the velocities of the elements, where, for example, the frame rate may be faster when the elements move quickly, and may be slower when they move more slowly.

Note that since nodes may generally repel each other, they may not spontaneously move past each other, with the result that the diagram can be stable in multiple different arrangements. Moreover, due to the automatic equilibrium seeking behavior of the collective system, the user may adjust the gross layout, and the physics may "tidy" up the diagram as well as it can. Similarly, a user may expand or contract items in the block diagram (i.e., converting an item between a single icon representation (e.g., a subprogram node) and a multi-icon presentation of the item's constituent elements, e.g., the subprogram), and the elements may automatically adjust accordingly. This feature may be particularly useful with small display screens, e.g., tablet computers or even smart phones. Further embodiments regarding the relationship between the model and the animation of the graphical diagram are described below.

In one exemplary use case, when a node is dragged into or out of a structure node (frame or bounding structure/element), the node repels the boundary or border, but because the border has inertia (due to its mass), moving the node quickly can move the node past the border. Once on the other side the node repels it in the opposite direction, and thus, the node makes a little bounce when it crosses the border, which may have a nice physical feel to it (to the user). In some embodiments, one or more dynamical effects, such as this "bounce", may trigger corresponding sound effects, e.g., a "pop" sound, which may increase the enjoyment and thus the engagement of the user.

In another exemplary use case, such "live dragging" of nodes may be leveraged to implement wiring (between the nodes). For example, the user may tap a node to make terminals easier to hit, get a "plug" (e.g., a connector) and drag it to a terminal on another node. Since the plug is just another node, dragging it in/out of a structure to perform wiring may not require extra functionality to be designed into the system. The same gesture may be used to pull a plug off a node and wire it to something else, or to just leave it and wire it later. Having a plug floating in the diagram may be preferable to a "broken" wire.

Other synergies may also arise due to the complex nature of physical interactions among multiple elements, thereby further leveraging the techniques disclosed herein to improve and enhance the graphical editing experience.

As noted above, in some embodiments, an indication of the (one or more) forces or their effects may be displayed in the graphical program before or as the adjustment is performed. In some embodiments, such indications may be displayed as the graphical diagram is edited. Moreover, in some embodiments, key distances or auxiliary aspects of the above techniques may be displayed, e.g., expanded boundaries, minimum widths, etc. In some embodiments, the user may be able to invoke display of the relevant force laws/profiles, and may further be able to edit or configure any of the aspects or attributes described herein. As noted above, any of the techniques disclosed herein may be similarly applicable to other graphical diagrams, e.g., system diagrams, physical diagrams, configuration diagrams, etc., where system components, e.g., hardware and/or software components, are linked together in particular ways.

Figure 13A:
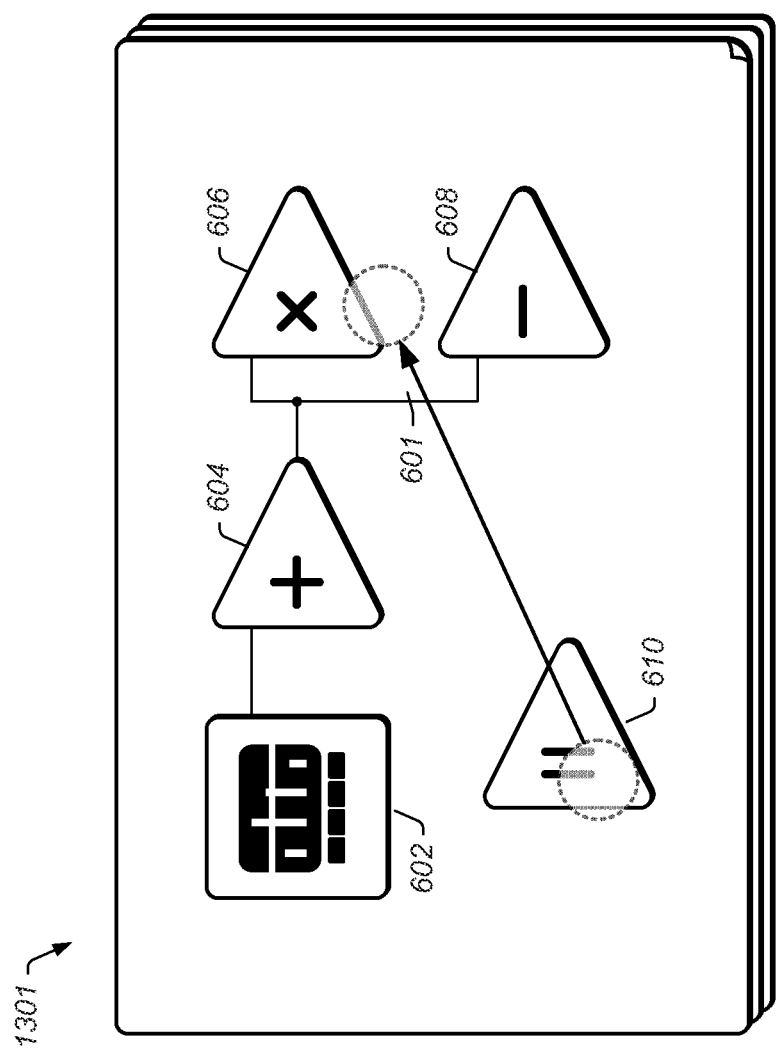
FIGS. 13A and 13B illustrate movement of a graphical diagram element, and subsequent rearrangement of diagram elements, according to one embodiment.
Figure 13B:
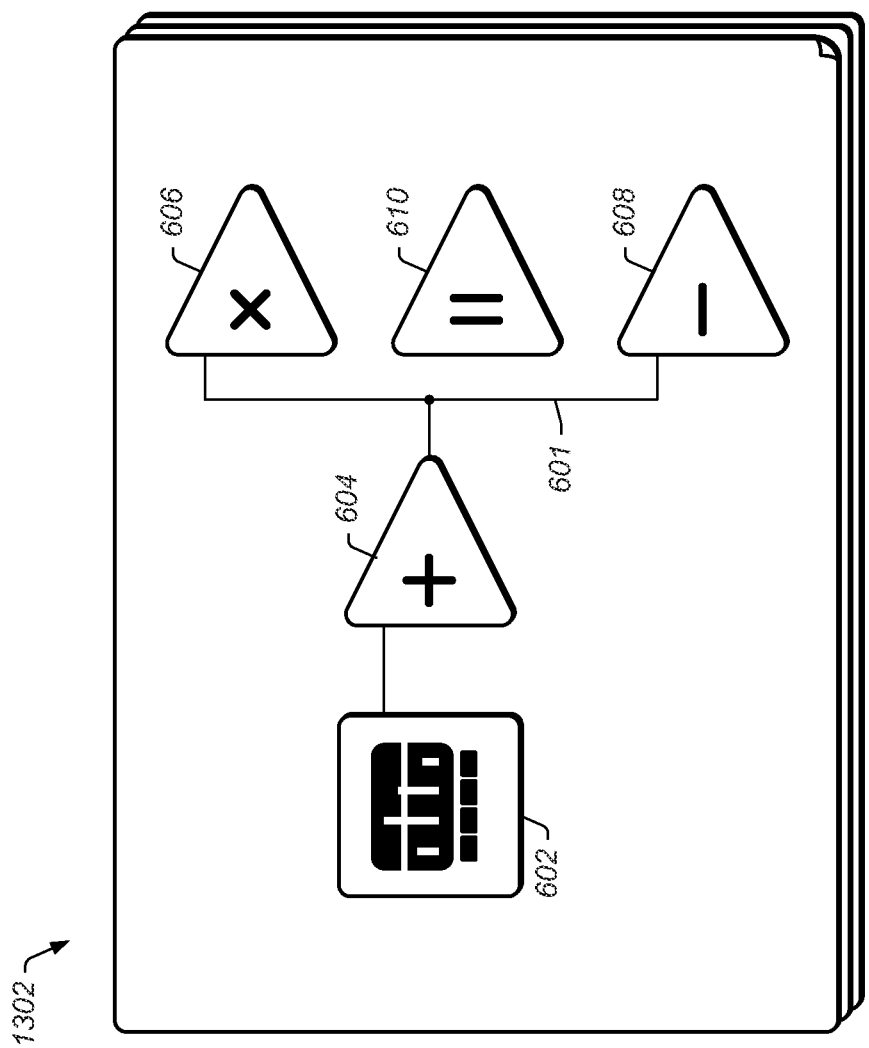

FIGS. 13A and 13B—Exemplary Embodiment

The following presents an exemplary illustrative example of the above techniques wherein the exemplary block diagram (or graphical program) of FIG. 6 is edited, and exemplary results of applying forces are shown. More specifically, FIGS. 13A and 13B illustrate movement of a graphical program element, and subsequent rearrangement of program elements, according to one embodiment.

As shown, FIG. 13A illustrates user input specifying moving node 610 to be between nodes 606 and 608 in diagram or graphical program 1301. Note that in this particular case, the movement is specified via a user gesture in which the user taps or otherwise selects the node 610 with a finger (represented by a dashed circle overlaid on node 610) and moves, e.g., drags, the node to the new location (represented by the second dashed circle disposed between nodes 606 and 608). However, any techniques specifying edits may be used as desired, including via a pointing device, such as a mouse or trackpad, via menus, key commands, and so forth.

FIG. 13B illustrates graphical program 1302 after forces have been applied to the diagram or graphical program 1301 of FIG. 13A, where, as may be seen, nodes 606 and 608 have been automatically moved to make way for node 610, wire 601 has been extended and moved accordingly, and nodes 602 and 604 repositioned towards the center of the modified diagram. As noted above, in some embodiments, the method may present an animation or movie that illustrates transition from the diagram of FIG. 13A to that of FIG. 13B.

As explained in more detail below, in some embodiments, the editing, adjusting, and displaying of the adjusted graphical diagram (e.g., program) may be separate discrete events or processes, where, for example, the user may move an element to a new position, after which the forces are computed and applied to other elements in the diagram (but invisibly to the user), and then the resulting adjusted diagram is displayed, such that intermediate states of the diagram are not presented to the user.

In contrast, in other embodiments, at least a portion of the editing, adjusting, and displaying the adjusted edited graphical program are performed concurrently, e.g., in an interleaved manner, where, following the movement example above, as the user starts moving the element, corresponding forces are computed and applied to the other elements (based on the change of position so far) and the resulting incrementally adjusted diagram displayed to the user. As the movement (or more generally, the editing operation) continues, the forces are continually updated and applied, and successive states of the adjusted diagram displayed. Note, however, that in some embodiments, the editing may be a simple discrete event, e.g., if the user simply deletes an element in one action, and so the edit operation may be over by the time the forces change as a result, but the application of resulting net forces, adjustments, and display of the adjusted diagram may unfold dynamically, e.g., smoothly, as the diagram or model approaches equilibrium, thus animating the evolution of the diagram to equilibrium.

In some embodiments, one or more auxiliary features, components, or elements, invoked on, from, or associated with, a graphical program node or other element may be considered as an (possibly temporary) edit operation, and thus may instigate or invoke a corresponding application of forces. For example, user selection of a node may invoke display of one or more selectable elements that may operate to configure, manipulate, access properties of, delete, or otherwise modify the node. In some embodiments, such elements may be referred to as "affordances", although any other names may be used as desired. In one embodiment, selection of a node may invoke enlargement of the node to facilitate further user interaction with the node, e.g., to display one or more affordances. Such affordances and enlargements may result in automatic rearrangement of the graphical program via application of forces, as described herein. Similarly, in some embodiments, when the node is de-selected, operations with the affordance or completed, or when some other suitable state is achieved, the affordance may be hidden or removed, and the node may be compacted or contracted, in response to which the graphical program may again be rearranged via application of forces.

Figure 14A:
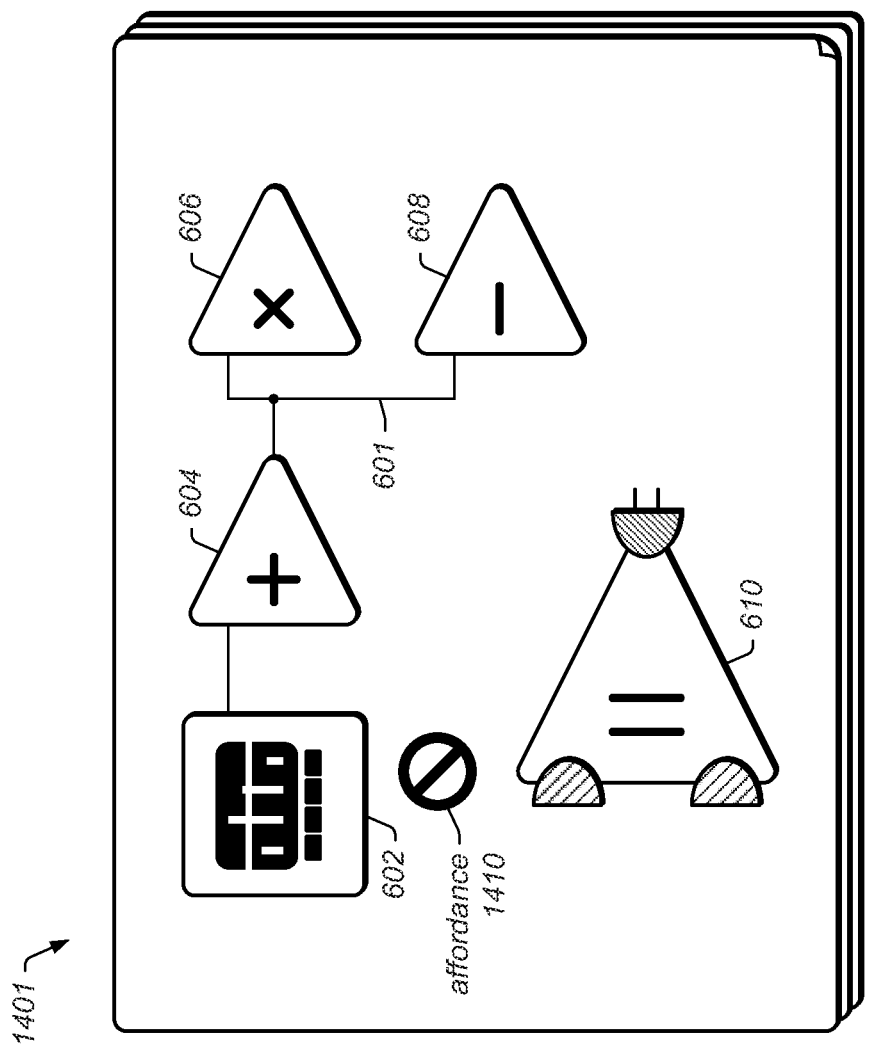
FIGS. 14A-14C illustrate enlargement of a graphical diagram element, including display of an affordance and terminals, connection of the element to another element, and subsequent rearrangement of diagram elements, including compaction of the graphical diagram element, according to one embodiment.
Figure 14B:
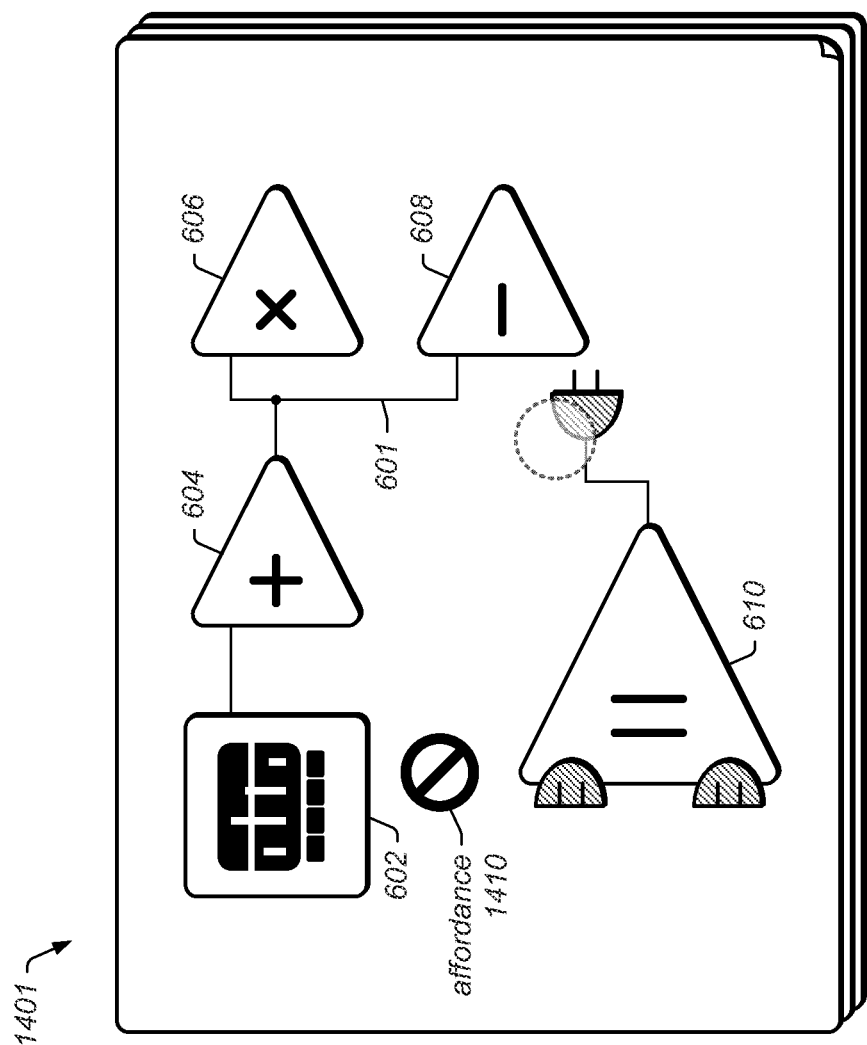
Figure 14C:
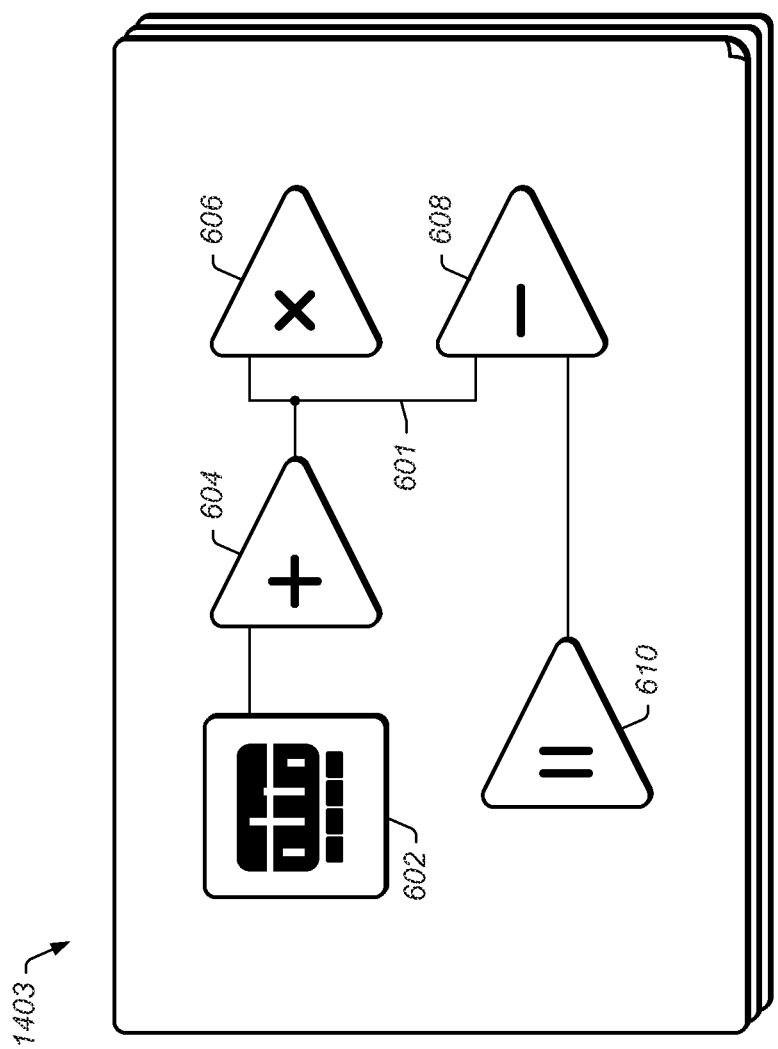

FIGS. 14A-14C illustrate an exemplary embodiment of a graphical program 1401 which is similar to the graphical program 600 of FIG. 6, and particularly illustrates enlargement of a graphical program element, including display of an affordance and terminals, connection of the element to another element, and subsequent rearrangement of program elements, including compaction of the graphical program element, according to one embodiment.

In this exemplary case, the absolute value node 610 has been selected, e.g., via a single tap, and in response, the node has been enlarged and a "delete" affordance 1410 displayed, where the delete affordance is selectable by the user to delete the node from the graphical program. As also shown, the selection of the node 610 has also invoked display of respective node terminals near the corners of the node, where those on the left of the node are input terminals, and that on the right is an output terminal. Note that the node has been enlarged to make user interaction with the node easier.

Accordingly, FIG. 14B illustrates user specification (again by gesture) of a wire between the output terminal of the node 610 and node 608, where the user has selected the output terminal and moved or dragged the terminal proximate to node 608 via a gesture, as indicated by the dashed circle. Thus, the user has specified an edit operation where node 610 is connected to node 608.

FIG. 14C illustrates the graphical program of FIGS. 14A and 14B after forces have been applied in response to the edit operation of FIG. 14B, resulting in (edited) graphical program 1403. Note that once the edit operation was performed and implemented, the node 610 was reduced back to its normal size (compaction), and the various auxiliary elements, e.g., affordances, removed from the display, specifically, the delete affordance and terminals have been removed from the display. Moreover, application of the forces has resulted in node 610 being automatically positioned to make the wire joining it to node 608 straight, which is simpler and possibly more pleasing aesthetically.

Note that other affordances may operate differently. For example, an exemplary affordance that facilitates configuration of a node may be displayed in response to a single tap on a node (which may also invoke enlargement of the node). The affordance may be a symbol, icon, or label, displayed on or near the associated node, and may indicate the meaning or nature of the affordance. A single tap on the affordance may invoke display of a dialog, menu, palette, etc., via which the user may configure the node. In some embodiments, the display of such elements, e.g., dialogs, menus, palettes, etc., may not perturb the graphical program (although display of the affordance may, as noted above). In other words, while introduction and display of some elements may perturb the geometry of the program, and thus result in force-mediated rearrangement of program elements, the addition and display of other elements may not; rather, displays of these non-perturbing elements may be overlaid on or near their associated nodes (or other elements) without introducing imbalances or perturbations in the model forces.

In some embodiments, one or more of the above-described effects or elements may be time limited. For example, when display of an affordance, enlargement, etc., is invoked, a timer may be initiated, and upon expiration of a specified duration, the effect, e.g., affordance, enlargement, etc., may be removed, deactivated, etc. However, in some embodiments, user interaction with the node or associated effect (e.g., affordance) may reset the timer.

A graphical user interface (GUI) may be provided whereby physical (i.e., physics based) parameters and/or constraints related to diagram elements and/or the diagram in general may be specified. Examples of configurable parameters include, but are not limited to, mass, viscosity, friction, maximum velocity, maximum (and/or minimum) repulsive or attractive force, model timestep or update frequency, and animation timestep/framerate (draw rate), among others. In various embodiments, a GUI may be invoked at the element level (e.g., invoked via an affordance associated with the element, pop-up menu, etc.), at the diagram or program (e.g., global) level, or even at the development environment level, e.g., where, for example, default values may be specified for any diagrams or programs in development. Any types of GUI may be used as desired, where the GUI may include one or more controls and/or indicators for manipulating and/or viewing parameter values. Thus, the method may further include displaying a graphical user interface (GUI) that includes one or more controls or indicators. User input may be received specifying or modifying one or more of at least one parameter of the one or more physics based parameters, or at least one qualitative aspect of the model or model behavior. Executing the model may then be performed (or resumed or continued) in accordance with the specified or modified at least one parameter or at least one qualitative aspect. Note that in some embodiments, the model may be paused for such parameter modification, while in other embodiments, the displaying a GUI and receiving user input specifying or modifying may be performed dynamically during execution of the model.

In one exemplary embodiment, a GUI may present qualitative controls for specifying one or more parameters and/or the behavior of the model. For example, a GUI may present a "slider" control whereby a user may specify a value or level in a specified range for a user-perceivable attribute, e.g., a "slower/faster" control to determine how quickly elements may move towards equilibrium. Thus, the user may control a qualitative attribute without having to understand or even be aware of the one or more quantitative values involved in producing the qualitative attribute. Following the "slower/faster" example, in one embodiment, specifying a level of "speed" for the program model may in turn automatically specify respective levels of multiple physics parameters, e.g., maximum velocity or acceleration, mass, etc. In some embodiments, a user may optionally invoke display of these implied parameter values, and so may more readily understand the underlying mechanisms and results of such qualitative controls. In this manner, a user may productively manage or specify the model's convergence to equilibrium without understanding the more detailed or subtle nuances of the process of convergence (to equilibrium), but may learn the nature of these nuances with use, and thus become more sophisticated over time, e.g., specifying individual parameter values in addition to or instead of such qualitative attributes.

Further Embodiments

The following describes further exemplary embodiments of the techniques described herein. More specifically, further embodiments are described regarding the nature and relationship of and between the application of forces in the model of the graphical diagram (e.g., graphical program), and animation of the transition from an initial state when the edit is made to a final (equilibrium) state resulting from the application of forces invoked by the edit. It should be noted, however, that the various embodiments described are meant to be exemplary only, and are not intended to limit the embodiments to any particular set of features.

In one embodiment, forces associated with the graphical diagram may always be active. For example, the method may run the simulation of the diagram as long as the graphical diagram is displayed in an editor. Note that since movement of diagram elements may stop upon reaching equilibrium, i.e., upon reaching a state in which all forces are in balance, a user may not be aware that a model of the graphical diagram is executing until a new edit operation occurs or is invoked. Thus, in some embodiments, the method may further include repeating the determining, summing, and moving in an iterative manner prior to the receiving user input and after the equilibrium condition obtains, i.e., in a substantially continuous manner. Accordingly, displaying the graphical diagram and displaying the adjusted edited graphical program may be subsumed by displaying an ongoing animation of the diagram, where no movement is performed or illustrated unless some perturbation of the diagram geometry occurs, e.g., in response to an edit operation, or unless the diagram is not in an equilibrium condition or state, although the model may continue to execute, sum forces, etc. In other words, displaying the animation may include the displaying of the graphical diagram (502), illustrating the moving (as forces are applied), and displaying the adjusted edited graphical diagram (508), e.g., an animation may be displayed, e.g., in the edit window, illustrating the movement of the elements to an equilibrium state in which the forces balance and movement ceases.

As noted above, in some embodiments, at least a portion of the editing, adjusting, and displaying the adjusted edited graphical program may be performed concurrently, or in an interleaved manner. For example, in an exemplary case where the user input moves a node from a first location to a second location, as soon as the node's movement begins, resulting net forces may be determined and the adjusting may also begin accordingly, e.g., other nodes may start moving in response to the moving of the node, and may also be displayed accordingly, and so on in an iterative manner. When the node reaches the second location, the force determination, adjustments, and display may be continued, thereby allowing the diagram elements to reach equilibrium. As noted elsewhere, in some embodiments, the force determination and displaying of the adjusted diagram may be performed continuously even after equilibrium is reached, but since the forces are balanced (due to equilibrium being attained), no adjustments, and thus, no changes in the display, may occur, and thus it may not be apparent to the user that the physics simulation is still executing.

In other embodiments, the editing, adjusting, and displaying may be discrete events or operations. For example, the user may edit the graphical diagram, e.g., moving a node to a new location, after which the forces may be calculated and applied "behind the scenes", and once equilibrium is reached, the adjusted diagram may be displayed. Thus, from the user's perspective, the displayed diagram may not evolve smoothly, even though the underlying or associated model may do so, i.e., the displayed diagram may "jump" from the edited diagram image to the final adjusted diagram image wherein all motion of diagram elements has already ceased.

Alternatively, in some embodiments, the model may begin execution in response to an edit operation, e.g., a perturbation of the diagram layout or geometry, and may cease or pause execution of the model upon reaching equilibrium, e.g., the modeling aspect may enter a "sleep" mode, and may be awakened by the next edit/perturbation. Note that "reaching equilibrium" may mean approaching a state that is within some specified tolerance or "epsilon" of the ideal equilibrium state. For example, generally, as an element approaches its equilibrium state (position), the forces, and thus, the resulting velocity, may approach zero, e.g., asymptotically, and depending on the resolution of the data (e.g., 32 bit, 64 bit, etc.) may require significant time to actually stop (come to rest), or may tend to "wiggle" indefinitely around the equilibrium value. Thus, in one embodiment, the method may cease applying forces (and thus stop moving the elements) when some value or metric achieves some specified threshold, e.g., when the largest current movement, velocity, or acceleration in the model is less than or equal to a specified threshold. Note that in some embodiments, ceasing application of forces may be achieved by setting all forces to zero.

As noted above, in some embodiments, the graphical program or diagram can be stable in multiple different arrangements. Thus, in response to an edit operation (or other perturbation) that changes the geometry of the graphical diagram (including changes in individual elements), the method may execute (or continue executing) the model to find the nearest equilibrium state (with respect to the current state). As discussed in detail above, examples of such edits or perturbations may include such operations as adding, removing, connecting, or moving, a graphical diagram element (e.g., icon, node, frame, structure, boundary, wire, edge, etc.). Further examples of such operations include, but are not limited to, selecting, enlarging, compacting or contracting, expanding, collapsing, or resizing an element in the graphical diagram, displaying an affordance of an element in the graphical diagram, or displaying a terminal of an element in the graphical diagram, among others. Note that expanding and collapsing are actions or operations regarding replacement in a diagram of an icon with its constituent elements (expansion), and replacement of multiple elements, e.g., a program or subprogram, or more generally, a diagram or sub-diagram, with a representative icon (collapse), respectively. This is in contrast to enlarging and compacting/contracting, in which an element, e.g., a graphical program node, is enlarged in place (in a diagram) to facilitate user interaction with the element, and may include (temporarily) increasing the size of the element, and displaying additional aspects, such as terminals and affordances (enlargement), and returning an enlarged element to its original size/appearance (compaction/contraction). Note that in various embodiments, the one or more elements may include one or more of: at least one graphical program node, at least one wire connected to a graphical program node, or at least one terminal in the graphical program, e.g., a terminal of a program node or a GUI or GUI element, e.g., of a front panel. More generally, the one or more elements may include one or more of: at least one graphical diagram node, at least one wire connected to a graphical diagram node, or at least one terminal in the graphical diagram, e.g., a terminal of a diagram node or a GUI or GUI element, e.g., of a front panel.

As noted above, in some embodiments, the "frame rate" (i.e., cycle frequency or update rate) of the model/simulation may be different from that of the animation or movie, e.g., the "draw rate". More generally, in some embodiments, there may be a nonlinear relationship between the simulation rate and the animation frame rate. Additionally, in some embodiments, one or more of the physics parameters employed in the model may be time or context dependent. For example, at least one physics parameter may be dynamically modified during execution of the model to achieve some desired effect, e.g., to make the animation and/or feedback from editing more pleasing or effective to a user. In other words, certain actions or movements may be more pleasing or understandable to users, and one or more physical parameters may be modified dynamically to implement these actions or movements.

As one example, viscosity (e.g., resistance to motion), friction, or other damping parameter, directed to a given element (or multiple elements) may be dynamically modified, e.g., increased, as an element approaches an equilibrium position or zero velocity to more rapidly bring the element to rest at its final state and avoid oscillations about the equilibrium state. As a further example, friction (or viscosity) may be a function of the velocity, or the square of velocity, and so may operate to limit acceleration. In yet another example, a "temperature" of the graphical diagram or model may be defined that indicates, and possibly bounds, the overall energy of motion of the constituent elements, and may be manipulated to effect, e.g., lessen or normalize, the time of convergence to equilibrium. Note that the above examples are exemplary only, and that in various embodiments, any of the physics parameters of the model may be dependent on, or manipulated dynamically based on, time, context, or any other parameter or aspect of the model or its elements, as desired.

In some embodiments, one or more physics based parameters of the graphical diagram or graphical diagram elements, e.g., velocity, maximum velocity, acceleration, maximum acceleration, etc., may have respective profiles that specify values for the parameters over time, e.g., over the duration of the convergence process, or with respect to some other attribute or parameter. The method may thus include applying respective profiles to the one or more physics based parameters of the graphical diagram or graphical diagram elements, wherein each profile specifies a sequence of values for a respective parameter. In some embodiments, such profiles may be normalized, and may be scaled as needed for application to elements to effect a trajectory to equilibrium. Thus, for example, the same velocity profile may be scaled differently, e.g., time-wise, for application to different elements.

The method may "auto-tune" the model to improve the user's editing experience. For example, the model may be tuned automatically to achieve critical damping or time-normalization of the convergence process. Critical damping refers to a configuration where a system reaches equilibrium most quickly without oscillations. Time-normalization refers to the imposition of a specified duration for a process, e.g., the convergence to equilibrium process. For example, a user (or a default setting) may specify the duration to be, e.g., 2 seconds, and so the convergence process may be managed or manipulated in such a way that convergence to equilibrium occurs by approximately this time, e.g., within some specified tolerance. There are a number of different ways this can be accomplished.

In some embodiments, auto-tuning may include computing or estimating a metric or figure of merit that represents or indicates the degree to which the graphical diagram is arranged in an optimal or desired manner, e.g., with respect to simplicity, clarity, compactness, and so forth. Such arrangements may be considered target states, and may be equivalent to or may correspond to equilibrium states of the model. Thus, the method may determine or estimate a value of the figure of merit (or metric) corresponding to a target state, and by comparing the current value for the diagram or model, may determine a (possibly rough) estimate of the "distance" from equilibrium of the diagram or model. The method may then automatically tune or adjust various of the physics parameters of the model to control or optimize convergence to equilibrium. In some embodiments, a state space may be defined for the model, and the figure of merit, equilibrium points/target states, and distances may be determined in or with respect to the state space. Moreover, in some embodiments, equilibrium values and distances to such values may be determined empirically. For example, data regarding many diagrams, edits, convergence histories, and/or equilibrium points, and possibly user feedback re animations, may be collected from many users, e.g., at a server, and may be used to develop heuristics regarding the figure of merit/metric, equilibrium points and distances thereto, convergence times, and parameter profiles, among other aspects of the techniques disclosed herein. For example, the data may be (automatically or manually) analyzed to determine a set of "atomic" or fundamental scenarios or diagram configurations and corresponding values (of parameters, times, distances, etc.), which may be used to estimate values for combinations of these scenarios or configurations. In one embodiment, a diagram may be analyzed and decomposed to its constituent fundamental scenarios or configurations, which may then be used to determine such values of the diagram in general.

In some embodiments where computation resources are such that the model executes faster than real time, in response to a perturbation (e.g., an edit operation), the method may determine or retrieve a value of the figure of merit corresponding to an equilibrium or target state, or may determine the equilibrium or target state itself. For example, the method may execute the model to converge to an equilibrium or target state, e.g., in the background, so that the model execution is invisible to the user. The method may log or otherwise store some or all of the intermediate states of the model/diagram (e.g., positions, velocities, forces, sizes, and any other relevant attributes or parameters of the graphical diagram, including those of the graphical diagram or diagram elements), and may then produce an animation that illustrates the convergence to equilibrium, e.g., by sampling the sequence of states, and drawing the graphical diagram in accordance with the sampled sequence of states. More specifically, in some embodiments, e.g., where executing the model of the graphical diagram is performed faster than real time, the method may include saving a sequence of model states during execution of the model, and displaying an animation of the graphical diagram may include sampling the sequence of model states, thereby generating a sequence of sampled states, and displaying a sequence of images of the graphical diagram corresponding to the sequence of sampled states.

In other words, the method may selectively animate the convergence process in accordance with the sampled states. Note that the sampling and/or animation may not be linear with respect to the actual sequence of model states. For example, in an exemplary case where an element moves a great distance, most of the movement may not be interesting to a user, and so the method may extract (e.g., sample) and animate or illustrate a sparse set of states covering this less interesting portion of the model evolution, but may extract and animate a denser set of states covering the more interesting final evolution to equilibrium. Thus, in this exemplary embodiment, the animation displayed to the user may traverse the sparse set of states quickly, and then show the final approach to equilibrium in (relative) slow motion. More generally, the method may sample the state sequence of the model, and may map (possibly nonlinearly) the state samples to an animation of the desired duration. Note that this technique manipulates or "warps" the model time in a nonlinear fashion to achieve a pleasing or more engaging animation sequence. In some embodiments, the sequence of sample states (or animation frames) may be interpolated to smooth the animation.

In an alternate embodiment, the sequence of model states may itself be saved in a nonlinear manner with respect to time. For example, based on one or more specified attributes, e.g., velocities, movements, temperature or entropy, or any other attributes or parameters, key model states reflecting or corresponding to interesting or important aspects of the diagram's evolution to equilibrium may be saved and used to generate the animation, where the method interpolates between key animation frames corresponding to the key model states. In a further embodiment, the saved sequence of model states (or a sampled subset) may be mapped nonlinearly to animation frames, where more interesting or important portions of the model evolution are animated or illustrated at higher time resolutions (e.g., frames per second) than less interesting or important portions.

Note that a similar effect may be implemented via parameter profiles or other dynamic parameter adjustments, mentioned above. For example, to achieve a specified animation duration (e.g., 2 seconds), the method may determine, monitor, or track the distance from equilibrium, and may dynamically modify physical parameters during the convergence process to reach equilibrium at or near the specified deadline. Alternatively, one or more parameter profiles may be determined or selected based on the distance to equilibrium, desired duration of the animation, etc., and the model configured (possibly dynamically) and executed accordingly. In some embodiments, some combination of these techniques may be used. Thus, for example, the method may sample the state sequence of the model, and may map the state samples to an animation of the desired duration and in accordance with one or more acceleration or velocity profiles (or profiles of other parameters or attributes as desired).

Note that the above techniques are not limited to graphical program editing, but are broadly applicable to any type of diagram that is subject to perturbations to its geometry, and for which clarity of (user perceptions of) the diagram is desired. Thus, for example, the above techniques may be applied to system diagrams, physical diagrams, configuration diagrams, etc., where system components, e.g., hardware and/or software components, are linked together in particular ways, as noted above.

Figure 15:
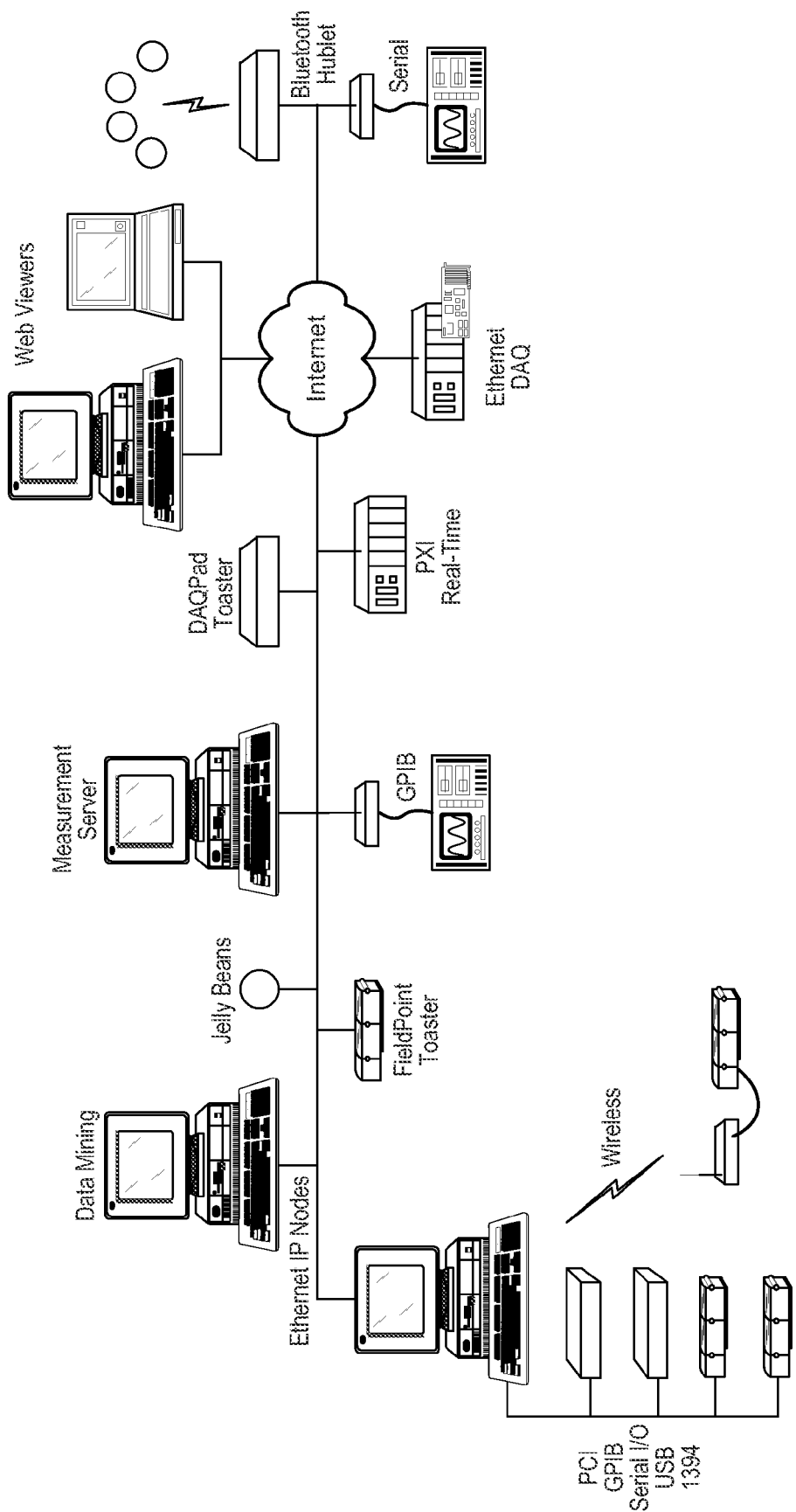
FIG. 15 illustrates an exemplary system diagram, according to one embodiment.

FIG. 15 illustrates one embodiment of a configuration diagram representing a distributed hardware system. As may be seen, this particular example system includes a plurality of devices coupled via a variety of communication buses, including Ethernet (Internet), GPIB, Wireless (e.g., Ethernet, Bluetooth), PCI, Serial I/O, USB, and 1394, as illustrative examples of inter-device connectivity means, although any other devices, buses, and protocols may be used as desired. Note that this exemplary diagram also includes a software icon labeled "Jelly Beans". In some embodiments, software icons may be displayed connected or proximate to hardware device icons to indicate that the corresponding software is deployed to or stored on the corresponding hardware device.

Any of the techniques disclosed above with regard to graphical programs may be applied to such diagrams and graphical diagrams in general, in a similar manner. More generally, any of the techniques disclosed herein may be used in any combination desired, with respect to any graphical diagrams desired.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A non-transitory computer-accessible memory medium that stores program instructions executable by a processor to implement:
   displaying a graphical diagram on a display device, wherein the graphical diagram comprises a plurality of interconnected nodes that visually indicate functionality of the graphical diagram;
   receiving user input editing the graphical diagram, thereby generating an edited graphical diagram;
   automatically adjusting placement of one or more elements within the edited graphical diagram based on said editing, wherein said adjusting is performed based on determined forces applied to the one or more elements in the edited graphical diagram, wherein said adjusting placement results in an adjusted edited graphical diagram, wherein said automatically adjusting comprises:
      for a first element of the one or more elements, determining one or more attractive or repulsive forces based on the position of the first element and at least one other element; and
      automatically adjusting the position of the first element based on the one or more attractive or repulsive forces; and
   displaying the adjusted edited graphical diagram on the display device.

2. The non-transitory computer accessible memory medium of claim 1, wherein at least a portion of said editing, said adjusting, and said displaying the adjusted edited graphical diagram are performed concurrently.

3. The non-transitory computer accessible memory medium of claim 1, wherein in implementing said adjusting placement, the program instructions are further executable to implement:
   determining the forces applied to the one or more elements in the edited graphical diagram based on the edit operation;
   calculating adjustments in placement of the one or more elements within the edited graphical diagram based on application of the determined forces to the one or more elements.

4. The non-transitory computer accessible memory medium of claim 1, wherein said adjusting placement of one or more elements comprises:
   determining one or more forces for each of the one or more elements based on their positions;
   summing the forces on each of the one or more elements, thereby determining resultant forces;
   moving the one or more elements based on the resultant forces; and
   repeating said determining, said summing, and said moving one or more times in an iterative manner until an equilibrium condition obtains.

5. The non-transitory computer accessible memory medium of claim 4, wherein said displaying comprises:
   displaying an animation that illustrates said moving.

6. The non-transitory computer accessible memory medium of claim 5, wherein the program instructions are further executable to perform:
   repeating said determining, said summing, and said moving in an iterative manner prior to said receiving user input and after the equilibrium condition obtains;
   wherein said displaying the animation further comprises:
      displaying the graphical diagram during said repeating said determining, said summing, and said moving in an iterative manner prior to said receiving user input and after the equilibrium condition obtains.

7. The non-transitory computer accessible memory medium of claim 4, wherein said determining, said summing, and said moving one or more times in an iterative manner comprises:
   executing a model of the graphical diagram, wherein the model specifies and implements physics based attributes and behaviors of the graphical diagram or elements of the graphical diagram via a plurality of physics based parameters.

8. The non-transitory computer accessible memory medium of claim 7, wherein said executing the model comprises:
dynamically modifying one or more of the physics based parameters of the graphical diagram or elements of the graphical diagram.

9. The non-transitory computer accessible memory medium of claim 8, wherein said dynamically adjusting one or more physics based parameters comprises:
applying respective profiles to the one or more physics based parameters of the graphical diagram or elements of the graphical diagram, wherein each profile specifies a sequence of values for a respective parameter.

10. The non-transitory computer accessible memory medium of claim 8, wherein the program instructions are further executable to perform:
displaying a graphical user interface (GUI) comprising one or more controls or indicators; and
receiving user input specifying or modifying one or more of:
at least one parameter of the one or more physics based parameters; or
at least one qualitative aspect of the model or model behavior;
wherein said executing the model is performed in accordance with the specified or modified at least one parameter or at least one qualitative aspect.

11. The non-transitory computer accessible memory medium of claim 8, wherein said displaying a GUI and said receiving user input specifying or modifying is performed dynamically during said executing the model.

12. The non-transitory computer accessible memory medium of claim 7, wherein the program instructions are further executable to perform:
repeating said determining, said summing, and said moving in an iterative manner prior to said receiving user input and after the equilibrium condition obtains; and
displaying an animation of the graphical diagram, including:
said displaying the graphical diagram;
illustrating said moving; and
said displaying the adjusted edited graphical diagram.

13. The non-transitory computer accessible memory medium of claim 12, wherein said executing the model of the graphical diagram is performed faster than real time, wherein the program instructions are further executable to perform:
saving a sequence of model states during execution of the model;
wherein said displaying an animation of the graphical diagram comprises:
mapping the sequence of model states to a sequence of images of the graphical diagram; and
displaying the sequence of images of the graphical diagram corresponding to the sequence of model states.

14. The non-transitory computer accessible memory medium of claim 13, wherein said mapping comprises a nonlinear mapping.

15. The non-transitory computer accessible memory medium of claim 12, wherein said executing the model of the graphical diagram is performed faster than real time, wherein the program instructions are further executable to perform:
saving a sequence of model states during execution of the model;
wherein said displaying an animation of the graphical diagram comprises:
sampling the sequence of model states, thereby generating a sequence of sampled states; and
displaying a sequence of images of the graphical diagram corresponding to the sequence of sampled states.

16. The non-transitory computer accessible memory medium of claim 1, wherein the user input specifies or manipulates a graphical diagram element in the graphical diagram.

17. The non-transitory computer accessible memory medium of claim 1, wherein the user input invokes or specifies one or more of:
selecting an element in the graphical diagram;
adding an element to the graphical diagram;
removing an element from the graphical diagram;
connecting two or more elements in the graphical diagram;
moving an element in the graphical diagram;
enlarging an element in the graphical diagram;
compacting an element in the graphical diagram;
expanding an element in the graphical diagram;
collapsing an element in the graphical diagram;
resizing an element in the graphical diagram;
displaying an affordance of an element in the graphical diagram; or
displaying a terminal of an element in the graphical diagram.

18. The non-transitory computer accessible memory medium of claim 1, wherein the one or more elements comprise one or more of:
at least one graphical diagram icon;
at least one edge connected to a graphical diagram icon; or
at least one terminal in the graphical diagram.

19. The non-transitory computer accessible memory medium of claim 1, wherein the graphical diagram comprises a graphical data flow block diagram.

20. The non-transitory computer accessible memory medium of claim 1, wherein the graphical diagram comprises a graphical control flow block diagram.

21. A method, comprising:
utilizing a computer to perform:
displaying a graphical diagram on a display device, wherein the graphical diagram comprises a plurality of interconnected nodes that visually indicate functionality of the graphical diagram;
receiving user input editing the graphical diagram, thereby generating an edited graphical diagram;
applying forces to one or more elements in the edited graphical diagram based on said editing, wherein said applying forces operates to automatically adjust placement of the one or more elements within the edited graphical diagram, resulting in an adjusted edited graphical diagram, wherein said applying forces comprises:
for a first element of the one or more elements, determining one or more attractive or repulsive forces based on the position of the first element and at least one other element; and
automatically adjusting the position of the first element based on the one or more attractive or repulsive forces; and
displaying the adjusted edited graphical diagram on the display device.

22. A system, comprising:
a processor; and
a memory, coupled to the processor, wherein the memory stores program instructions executable by the processor to:
- display a graphical diagram on a display device, wherein the graphical diagram comprises a plurality of interconnected nodes that visually indicate functionality of the graphical diagram;
- receive user input editing the graphical diagram, thereby generating an edited graphical diagram;
- automatically adjust placement of one or more elements within the edited graphical diagram based on determined forces applied to the one or more elements in the edited graphical diagram based on said editing, resulting in an adjusted edited graphical diagram, wherein said automatically adjusting comprises:
  - for a first element of the one or more elements, determining one or more attractive or repulsive forces based on the position of the first element and at least one other element; and
  - automatically adjusting the position of the first element based on the one or more attractive or repulsive forces; and
- display the adjusted edited graphical diagram on the display device.

* * * * *